(12) United States Patent
Kasahara

(10) Patent No.: US 9,195,040 B2
(45) Date of Patent: Nov. 24, 2015

(54) IMMERSION MICROSCOPE OBJECTIVE AND MICROSCOPE USING THE SAME

(71) Applicant: OLYMPUS CORPORATION, Shibuya-ku, Tokyo (JP)

(72) Inventor: Takashi Kasahara, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/257,704

(22) Filed: Apr. 21, 2014

(65) Prior Publication Data
US 2014/0320975 A1    Oct. 30, 2014

(30) Foreign Application Priority Data

Apr. 24, 2013  (JP) ................ 2013-091282
Apr. 9, 2014   (JP) ................ 2014-079948

(51) Int. Cl.
G02B 21/02    (2006.01)
G02B 21/33    (2006.01)

(52) U.S. Cl.
CPC .............. G02B 21/02 (2013.01); G02B 21/33 (2013.01)

(58) Field of Classification Search
CPC ...................................................... G02B 21/33
USPC .................................................. 359/656, 779
See application file for complete search history.

(56) References Cited

U.S. PATENT DOCUMENTS

| 7,869,132 | B2 | 1/2011 | Saito et al. |
| 8,508,856 | B2 | 8/2013 | Saito et al. |
| 8,576,482 | B2 | 11/2013 | Saito et al. |
| 2010/0265574 | A1* | 10/2010 | Kasahara ................ 359/385 |

FOREIGN PATENT DOCUMENTS

JP    2010-008989 A    1/2010

* cited by examiner

*Primary Examiner* — James Jones
(74) *Attorney, Agent, or Firm* — Holtz, Holtz, Goodman & Chick PC

(57) ABSTRACT

An immersion microscope objective includes a first lens group having a positive refractive power, a second lens group having a positive refractive power, and a third lens group having a negative refractive power. The first lens group includes a cemented lens of a positive lens and a meniscus lens, and at least one positive single lens, the second lens group changes a divergent light beam to a convergent light beam, and the third lens group includes an object-side lens group and an image-side lens group disposed concave surfaces are face-to-face sandwiching one air space. There is a plurality of lenses having a positive refractive power, and at least one lens having a positive refractive power out of the plurality of lenses having a positive refractive power has a cemented surface which is cemented to a lens having a negative refractive power.

6 Claims, 13 Drawing Sheets

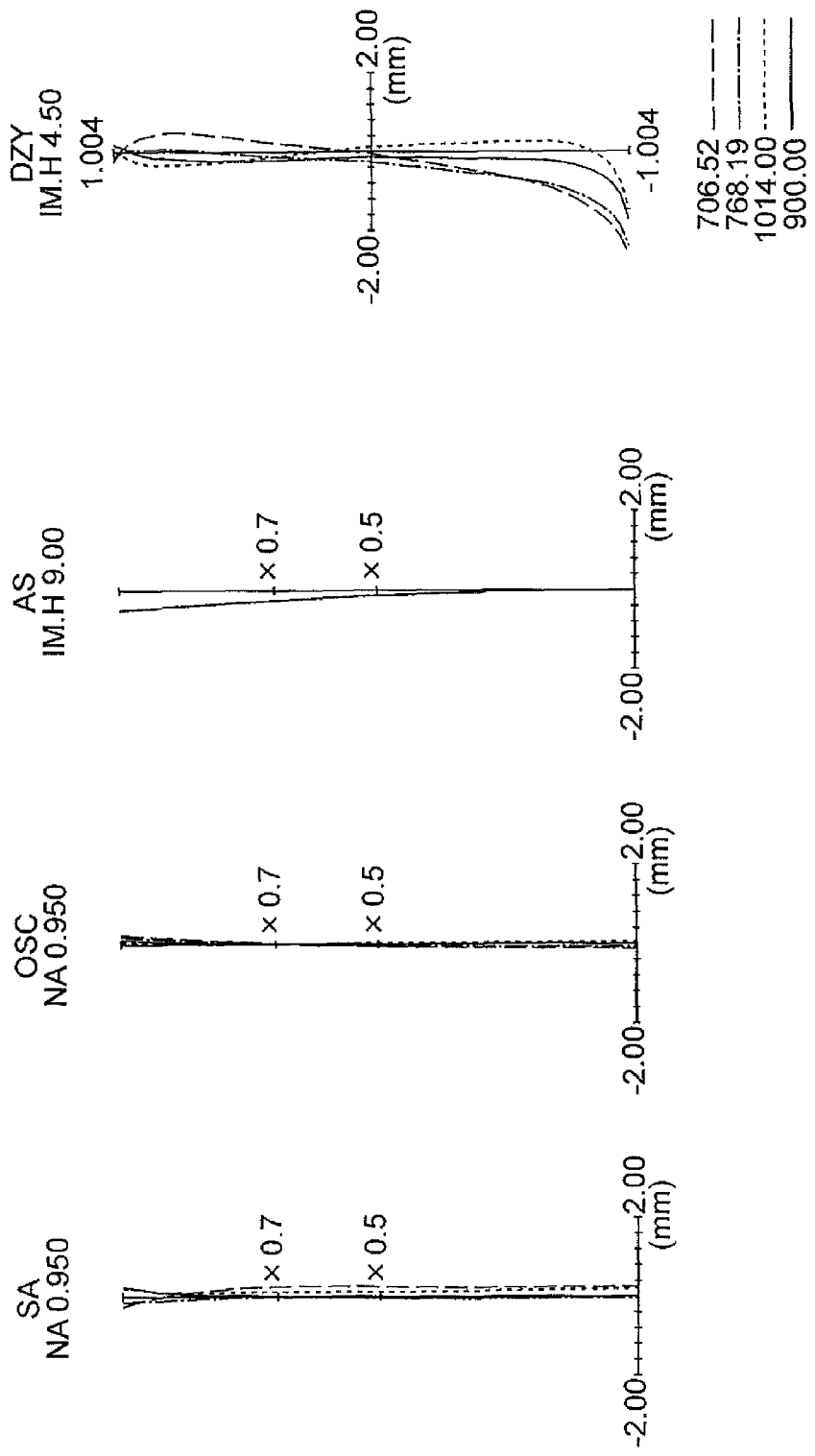

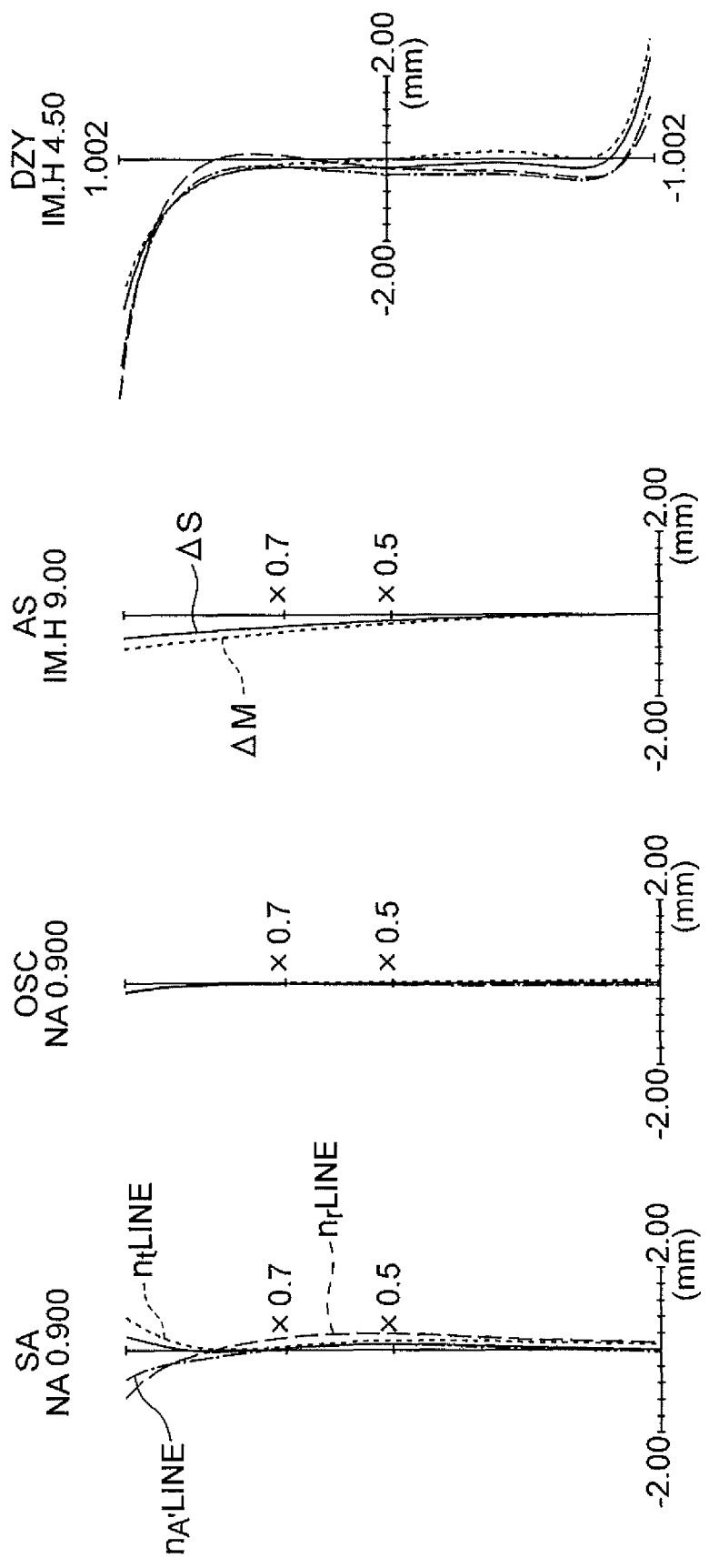

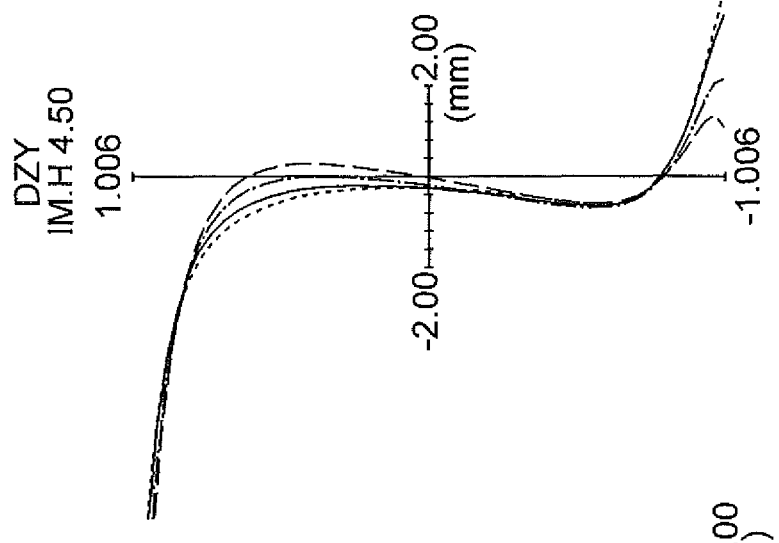
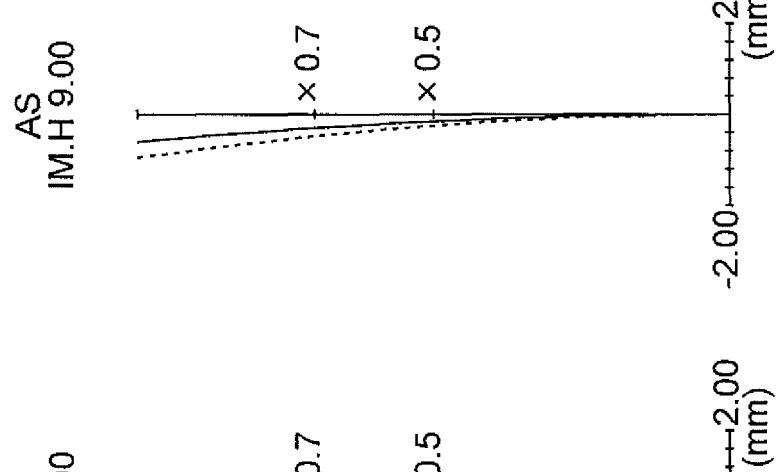
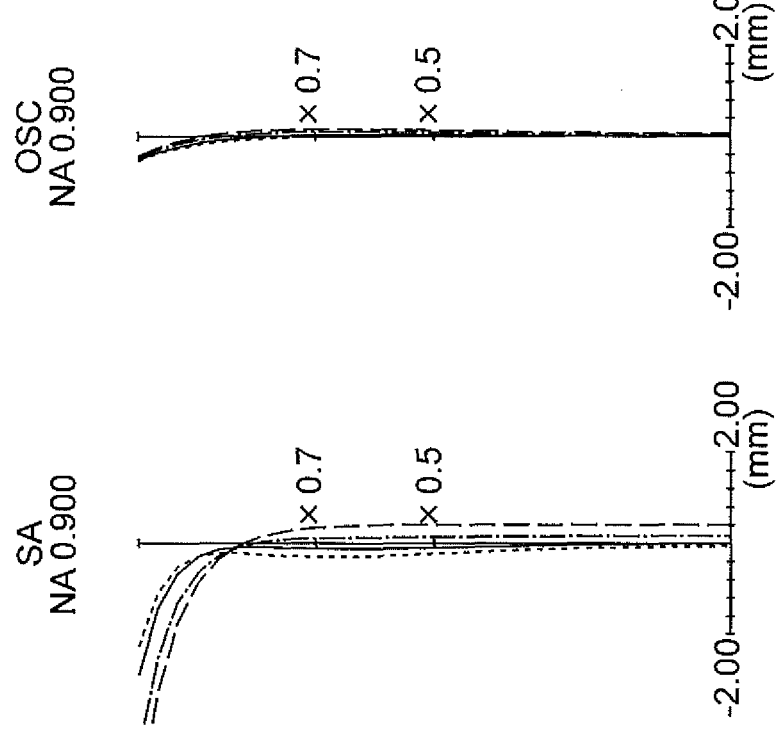
FIG. 6A  FIG. 6B  FIG. 6C  FIG. 6D

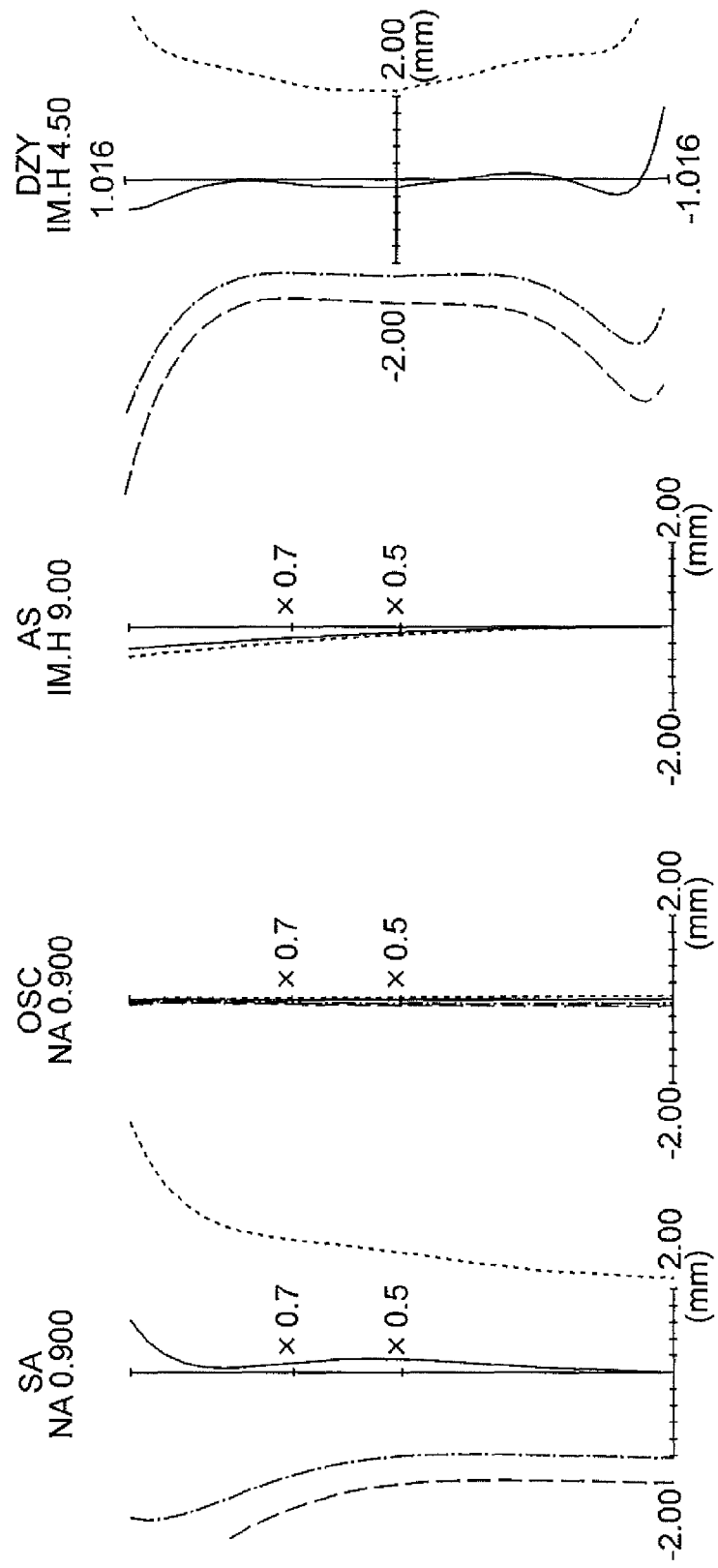

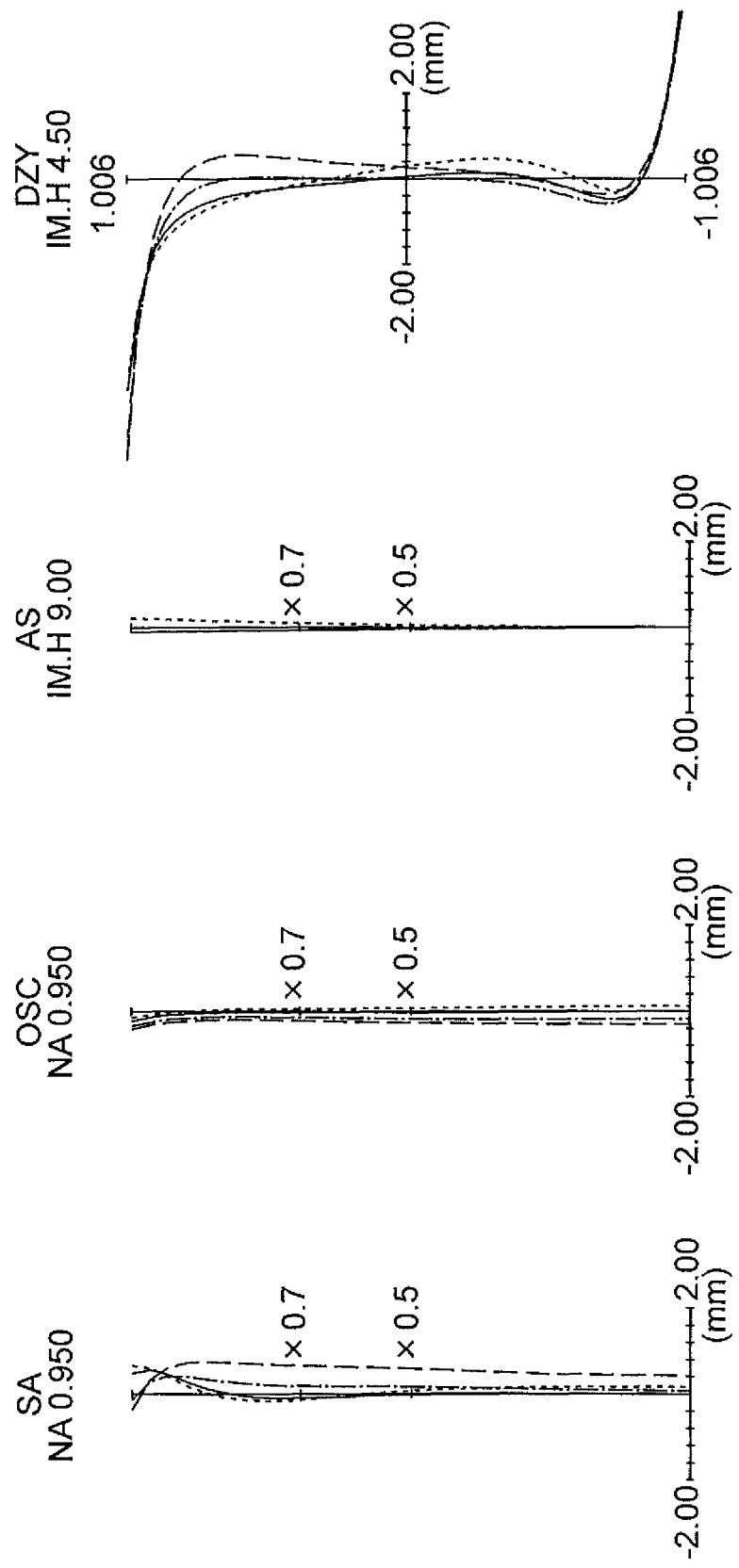

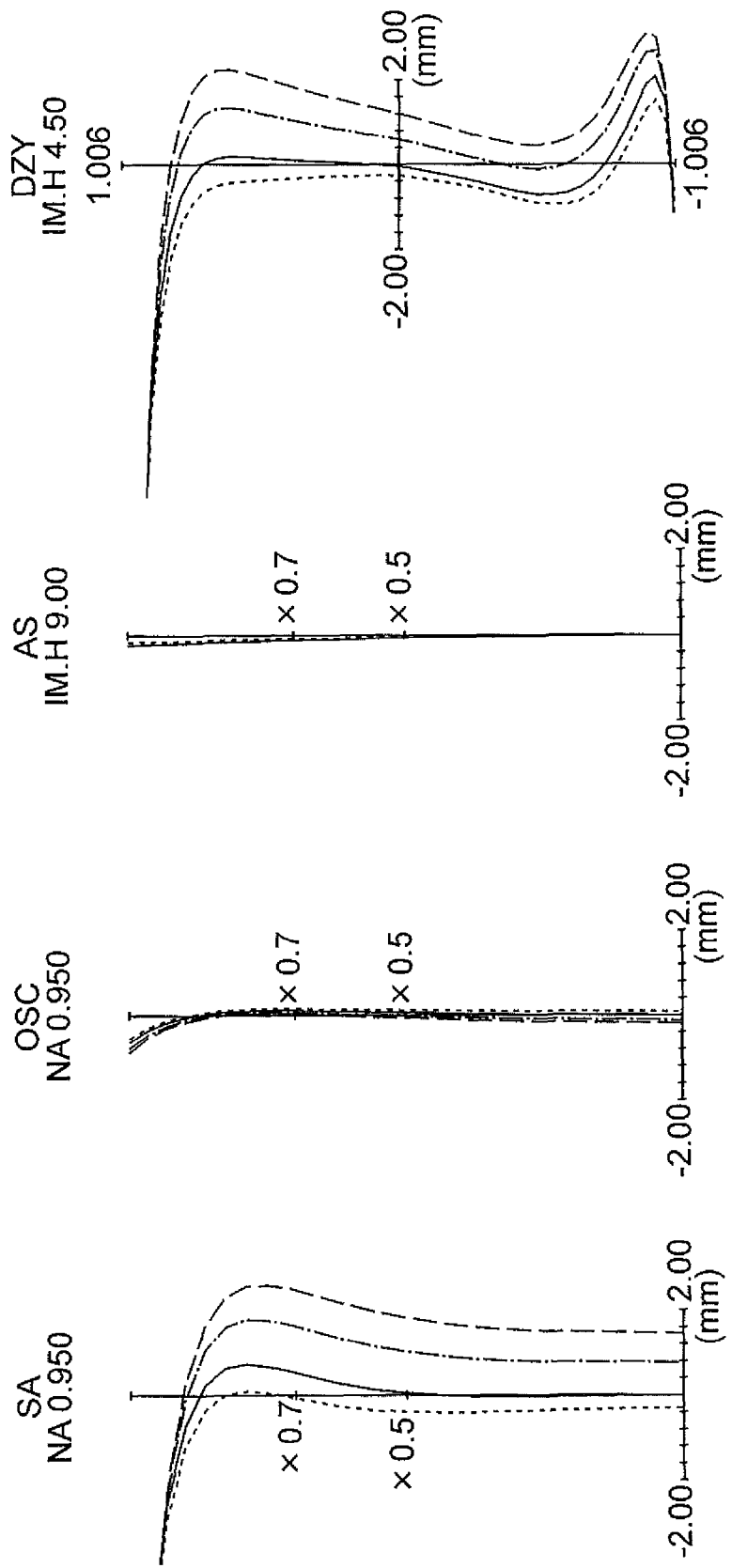

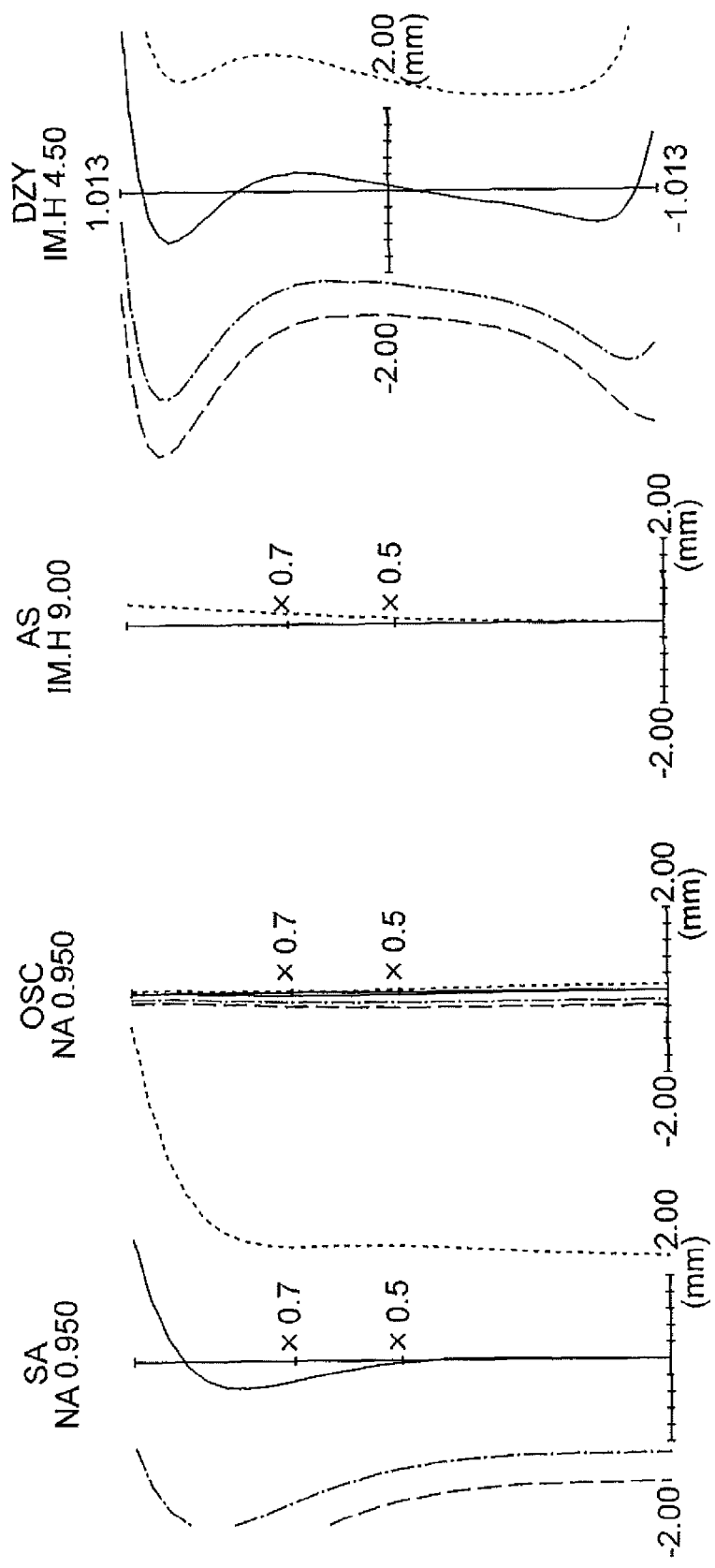

IMMERSION MICROSCOPE OBJECTIVE AND MICROSCOPE USING THE SAME

CROSS-REFERENCE TO RELATED APPLICATION

The present application is based upon and claims the benefit of priority from the prior Japanese Patent Application Nos. 2013-091282 filed on Apr. 24, 2013 and 2014-079948 filed on Apr. 9, 2014; the entire contents of which are incorporated herein by reference.

BACKGROUND OF THE INVENTION

1. Field of the Invention

The present invention relates to an immersion microscope objective, and a microscope using the same.

2. Description of the Related Art

As a means of fluorescence observation, a method of fluorescence observation by multi-photon excitation has been known. In the multi-photon excitation, light of a wavelength in almost integral multiples of an absorption wavelength of a fluorescent substance is irradiated to a fluorescent material (sample) as excitation light. Here, a wavelength of the excitation light in the multi-photon excitation being almost an integral multiple of the absorption wavelength, energy of one photon of the excitation light is almost an integral submultiple for the multi-photon excitation as compared to a single-photon excitation. Therefore, in the multi-photon excitation, it is necessary to make a plurality of photons collide with one fluorescent substance simultaneously.

When the excitation light is converged by a microscope objective, a density of light becomes the highest at a focal position. Therefore, a probability of the plurality of photons colliding with the fluorescent substance becomes the highest at the focal position. In the multi-photon excitation, the fluorescent light is generated only at the focal position (or in the extreme proximity of the focal position). For making the density of light at the focal position high, it is necessary to make a diameter of a light spot formed at the focal position as small as possible. In view of such circumstances, the microscope objective is sought to have a large numerical aperture and a superior imaging performance. If the imaging performance is superior, a light spot in which, various aberrations have been corrected favorably, is formed at the focal position.

Moreover, the excitation light used in the multi-photon excitation is infrared light. Light has a feature of longer the wavelength, lesser is the susceptibility of scattering of light (Rayleigh scattering). Therefore, in a sample having a scattering characteristic such as of a biological sample, the infrared light having a long wavelength is capable of reaching up to even deeper position as excitation light. For observing a deep portion of a sample by using this feature, the microscope objective is sought to have a long working distance.

Furthermore, even among the infrared lights, light having a longer wavelength has smaller Rayleigh scattering. Therefore the excitation light is capable of reaching even deeper position. For this reason, it is preferable that the microscope objective to be used in the multi-photon excitation has a longer wavelength and a superior imaging performance.

Moreover, in the observation of a deep position of a specimen, an aberration due to a refractive index of the sample cannot be ignored. Therefore, it is preferable that the microscope objective has a means of correcting fluctuation in such aberration.

As a microscope objective which has a large numerical aperture and in which, an aberration in an infrared region has been corrected favorably, an immersion microscope objective disclosed in Japanese Patent Application Laid-open Publication No. 2010-008989 is available.

SUMMARY OF THE INVENTION

An immersion microscope objective of the present invention includes in order from an object side,
a first lens group having a positive refractive power,
a second lens group having a positive refractive power, and
a third lens group having a negative refractive power, and
the first lens group includes a cemented lens and at least one positive single lens, and the cemented lens includes a positive lens and a meniscus lens, and
the second lens group changes a divergent light beam to a convergent light beam, and
the third lens group includes an object-side lens group and an image-side lens group, and
in the object-side lens group, a surface nearest to an image side is a concave surface which is directed toward the image side, and in the image-side lens group, a surface nearest to the object side is a concave surface which is directed toward the object side, and
there is a plurality of lenses having a positive refractive power, and
at least one lens having a positive refractive power out of the plurality of lenses having a positive refractive power has a cemented surface which is cemented to a lens having a negative refractive power.

Moreover, a microscope of the present invention includes a scanner section, a main-body section, and a microscope objective, and the abovementioned immersion microscope objective is used as the microscope objective.

BRIEF DESCRIPTION OF THE DRAWINGS

FIG. 4A, FIG. 4B, FIG. 4C, and FIG. 4D are aberration diagrams of the immersion microscope objective according the example 1;

FIG. 5A, FIG. 5B, FIG. 5C, and FIG. 5D are aberration diagrams of the immersion microscope objective according to the example 2, and are diagrams in a state 1;

FIG. 6A, FIG. 6B, FIG. 6C, and FIG. 6D are aberration diagrams of the immersion microscope objective according to the example 2, and are diagrams in a state 2;

FIG. 7A, FIG. 7B, FIG. 7C, and FIG. 7D are aberration diagrams of the immersion microscope objective according to the example 2, and are diagrams in a state 3;

FIG. 8A, FIG. 8B, FIG. 8C, and FIG. 8D are aberration diagrams of the immersion microscope objective according to the example 3, and are diagrams in a state 1;

FIG. 9A, FIG. 9B, FIG. 9C, and FIG. 9D are aberration diagrams of the immersion microscope objective according to the example 3, and are diagrams in a state 2;

FIG. 10A, FIG. 10B, FIG. 10C, and FIG. 10D are aberration diagrams of the immersion microscope objective according to the example 3, and are diagrams in a state 3;

DETAILED DESCRIPTION OF THE INVENTION

Figure 1:
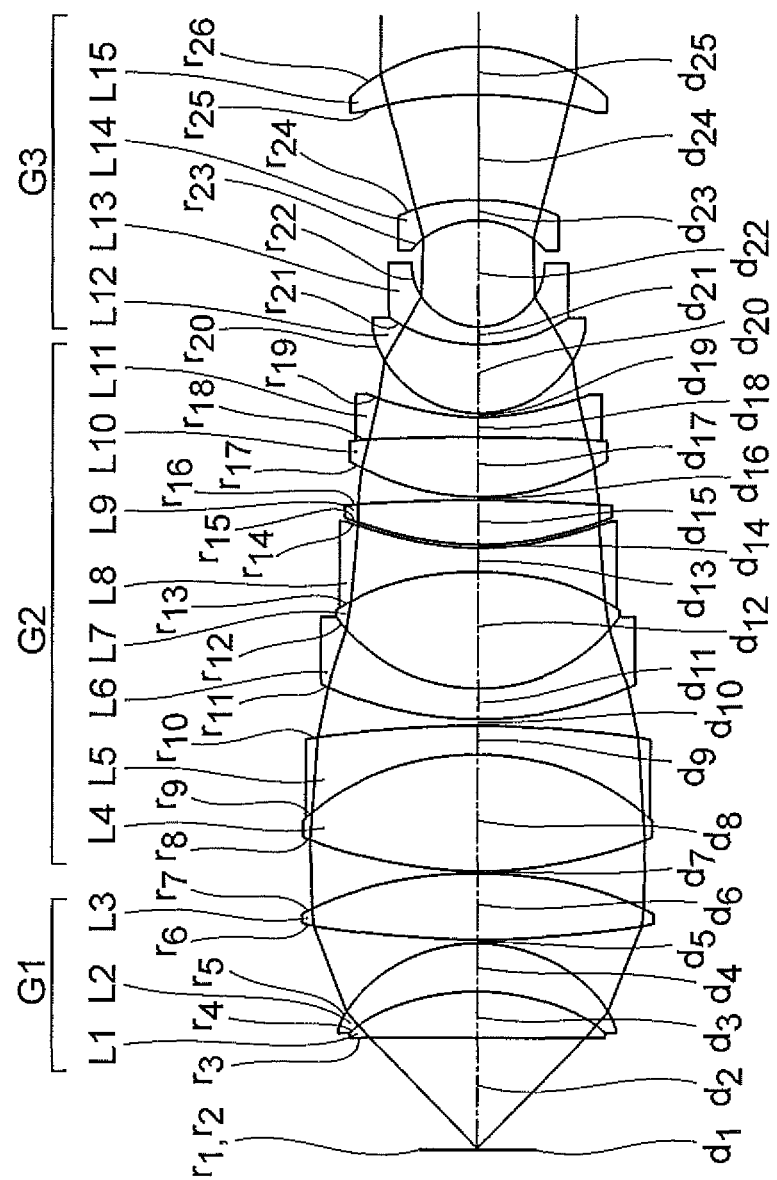
FIG. 1 is a cross-sectional view along an optical axis, showing an optical arrangement of an immersion microscope objective according to an example 1 of the present invention.

An immersion microscope objective according to a first embodiment includes in order from an object side, a first lens group having a positive refractive power, a second lens group having a positive refractive power, and a third lens group having a negative refractive power, and the first lens group includes a cemented lens and at least one positive single lens, and the cemented lens includes a positive lens and a meniscus lens, and the second lens group changes a divergent light beam to a convergent light beam, and the third lens group includes an object-side lens group and an image-side lens group, and in the object-side lens group, a surface nearest to an image side is a concave surface which is directed toward the image side, and in the image-side lens group, a surface nearest to the object side is a concave surface which is directed toward the object side, and there is a plurality of lenses having a positive refractive power, and at least one lens having a positive refractive power out of the plurality of lenses having a positive refractive power has a cemented surface which is cemented to a lens having a negative refractive power.

Moreover, the plurality of lenses having a positive refractive power include a lens which satisfies the following conditional expressions (1) and (2), and the following conditional expression (3) is satisfied.

$$-0.0065 \leq (n_{p1129}-n_{ps})/(n_{ps}-1) \leq -0.003 \quad (1)$$

$$0.588 \leq 1/n_{ps} \leq 0.667 \quad (2)$$

$$0.1 \leq d_1/WD \leq 1 \quad (3)$$

where, $n_{p1129}$ denotes a refractive index at a wavelength 1129 nm of the lens having a positive refractive power, $n_{ps}$ denotes a refractive index for an s-line (wavelength 852.11 nm) of the lens having a positive refractive power, WD denotes a working distance of the immersion microscope objective, and $d_1$ denotes a thickness of the lens positioned nearest to the object side.

The immersion microscope objective (hereinafter, called appropriately as 'objective') according to the embodiment includes in order from the object side, the first lens group, the second lens group, and the third lens group. The first lens group has a positive refractive power as a whole and includes the cemented lens and at least one positive single lens. The cemented lens includes the positive lens and the meniscus lens. The object side means a sample side.

If an object-side numerical aperture (hereinafter, called as 'numerical aperture') of the objective is made large, it is possible to make light with a large angle of divergence (angle of diffraction) incident on the objective from the sample. As a result, it is possible to observe a microscopic structure of the sample further minutely. However, light with a large angle of divergence has a high light-ray height in the first lens group. When such a light ray is bent rapidly in the first lens group, an aberration of higher order is susceptible to occur in the first lens group.

Therefore, in the objective according to the embodiment, by forming the first lens group by the cemented lens and at least one positive single lens, the light ray with a large angle of divergence is bent gradually by the cemented lens and the positive single lens. By making such an arrangement, the aberration of high order is suppressed from occurring substantially.

Moreover, the second lens group is let to have a positive refractive power as a whole. As aforementioned, in the first lens group, an arrangement is made to bend gradually the light ray with a large angle of divergence. Therefore, a light beam emerged from the first lens group is not a convergent light beam. In the second lens group, the divergent light beam is changed to a convergent light beam. One of the actions in the second lens group is to change the divergent light beam to the convergent light beam. Therefore, a lens which brings on such action is included in the second lens group.

Moreover, the third lens group has a negative refractive power as a whole, and includes the object-side lens group and the image-side lens group. In the object-side lens group, the surface nearest to the image side is a concave surface which directed toward the image side, and in the image-side lens group, the surface nearest to the object side is a concave surface which is directed toward the object side.

By disposing the object-side lens group and the image-side lens group such that the concave surfaces of the respective lenses are face-to-face sandwiching one air space, it is possible to bring a lens arrangement of the third lens group closer to a Gauss-type lens arrangement. Here, since the divergent light beam is changed to the convergent light beam in the second lens group, the height of the light ray is low at a position of the object-side lens group and a position of the image-side lens group. Therefore, by the concave surfaces of the object-side lens group and the image-side lens group, it is possible to make Petzval's sum small. Moreover, the convergent light beam from the second lens group is changed to a substantially parallel light beam by the third lens group.

Moreover, in the objective according to the embodiment, it is preferable that there is a plurality of lenses having a positive refractive power that satisfy the following conditional expressions (1) and (2), and at least one lens having a positive refractive power out of the plurality of lenses having a positive refractive power has the cemented surface which is cemented to the lens having a negative refractive power, and the following conditional expression (3) is satisfied.

$$-0.0065 \leq (n_{p1129}-n_{ps})/(n_{ps}-1) \leq -0.003 \quad (1)$$

$$0.588 \leq 1/n_{ps} \leq 0.667 \quad (2)$$

$$0.1 \leq d_1/WD \leq 1 \quad (3)$$

where, $n_{p1129}$ denotes a refractive index at a wavelength 1129 nm of the lens having a positive refractive power, $n_{ps}$ denotes a refractive index for an s-line (wavelength 852.11 nm) of the lens having a positive refractive power, WD denotes a working distance of the immersion microscope objective, and $d_1$ denotes a thickness of the lens positioned nearest to the object side.

By satisfying conditional expression (1), glass with moderately small dispersion for the s-line (($n_{ps}$−1)/($n_A$−$n_t$) where, $n_A$, denotes a refractive index at a wavelength 768.19 nm and $n_t$ denotes a refractive index at a wavelength 1014.00 nm), and moderately large partial dispersion for the s-line at a wavelength 1129 nm (($n_{p1129}$−$n_{ps}$)/($n_A$−$n_t$)) is to be used for the lens having a positive refractive power. For such glass, the dispersion for s-line is not only moderately small for the s-line but also moderately small in a wavelength region of 800 nm to 1000 nm.

Moreover, the partial dispersion for the s-line at the wavelength 1129 nm is not only moderately large at the wavelength 1129 nm but also moderately large at the wavelength 1129 nm or more. Also, the partial dispersion for the s-line at the wavelength 1129 nm is not only moderately large for the s-line but also moderately large in the wavelength region of 800 nm to 1000 nm. Therefore, it is possible to correct the chromatic aberration favorably in a wide range of the infrared region. In the following description, the dispersion or the partial dispersion in the abovementioned wavelength (wavelength region) will be called appropriately as dispersion or partial dispersion.

When exceeding an upper limit of conditional expression (1), either the dispersion in the lens having a positive refractive power becomes excessively small or the partial dispersion in the lens having a positive refractive power becomes excessively large. In this case, correction of the chromatic aberration becomes easy. However, the refractive index of the lens having a positive refractive power is susceptible to become small. Therefore, correction of an aberration of a high order becomes difficult.

When falling below a lower limit of conditional expression (1), either the dispersion in the lens having a positive refractive power becomes excessively large or the partial dispersion in the lens having a positive refractive power becomes excessively small. Therefore, it becomes difficult to correct favorably the chromatic aberration in the wide range of the infrared region.

By satisfying conditional expression (2), it is possible to make the refractive index of the lens having a positive refractive power large. Accordingly, it is possible to make the numerical aperture large while suppressing an occurrence of the aberration of high order, and besides, it is possible to make the working distance long.

When exceeding an upper limit of conditional expression (2), the refractive index of the lens having a positive refractive power becomes excessively small. Therefore, the occurrence of the aberration of high order cannot be suppressed. Moreover, it becomes difficult to make the numerical aperture large.

When falling below a lower limit of conditional expression (2), the refractive index of the lens having a positive refractive power becomes excessively large. In this case, it becomes easy to suppress the occurrence of the aberration of high order. However, it is not possible to make the dispersion in the lens having a positive refractive power small. Therefore, it is not possible to correct the chromatic aberration favorably.

Moreover, in the objective for which, the working distance is long, the height of the light ray becomes high at a surface nearest to the object side in the first lens group which is positioned nearest to the object side. Therefore, in the lens group positioned nearest to the object side, the aberration of high order and a field curvature are susceptible to occur. By satisfying conditional expression (3), it is possible to optimize a thickness of the lens positioned nearest to the object side with respect to the working distance. Accordingly, occurrence of various aberrations is suppressed to the minimum. $d_1$ denotes the axial thickness.

The working distance of the objective is a distance from a front end of the objective up to the sample (or a cover glass). Here, in a case in which, a position to be observed is at an interior of the sample, the working distance of the objective is not a distance from the front end of the objective up to a surface of the sample, but is a distance from the front end of the objective up to the position to be observed at the interior of the sample.

When exceeding an upper limit of conditional expression (3), the height of a light ray becomes excessively high at a surface nearest to the image side in the first lens group which is positioned nearest to the object side. Therefore, it is difficult to achieve a long working distance.

When falling below a lower limit of conditional expression (3), it becomes difficult to suppress an occurrence of a coma in the lens group positioned nearest to the object side.

In an objective having a correction ring, the working distance changes according to a position of the correction ring. In such objective, it is preferable that conditional expression (3) is satisfied for all the working distances.

It is preferable that the following conditional expression (1') is satisfied instead of conditional expression (1).

$$-0.0063 \leq (n_{p1129} - n_{ps})/(n_{ps}-1) \leq -0.0055 \quad (1')$$

Moreover, it is preferable that the following conditional expression (2') is satisfied instead of conditional expression (2).

$$0.629 \leq 1/n_{ps} \leq 0.65 \quad (2')$$

Furthermore, it is preferable that the following conditional expression (3') is satisfied instead of conditional expression (3).

$$0.3 \leq d_1/WD \leq 0.7 \quad (3')$$

As aforementioned, in the objective according to the embodiment, it is possible to make the working distance long, and in addition, it is possible to correct sufficiently various aberrations, and particularly the chromatic aberration, in the wide range of the infrared wavelength region.

Moreover, in the objective according to the embodiment, it is preferable that the following conditional expression (4) is satisfied.

$$0.8 \leq r_{1c}/r_{1i} \leq 1.6 \quad (4)$$

where, $r_{1c}$ denotes a radius of curvature of the cemented surface of the cemented lens in the first lens group, and $r_{1i}$ denotes a radius of curvature of the image-side surface of the cemented lens in the first lens group.

In the objective with a large numerical aperture, the height of the light ray becomes high at a surface nearest to the image side in the first lens group which is positioned nearest to the object side. Therefore, in the first lens group which is positioned nearest to the object side, a spherical aberration of high order and a coma of high order are susceptible to occur. By satisfying conditional expression (4), it is possible to optimize the height of the light ray in the first lens group. Accordingly, it is possible to correct simultaneously the spherical aberration of high order and the coma of high order.

When exceeding an upper limit of conditional expression (4), the height of the light ray becomes excessively low on the image side of the first lens group which is positioned nearest to the object side. Therefore, in the lens group which is on the image side of the first lens group positioned nearest to the object side, it becomes difficult to suppress an occurrence of the spherical aberration of high order and the coma of high order.

When falling below a lower limit of conditional expression (4), the height of the light ray becomes excessively high at a surface nearest to the image side in the first lens group which is positioned nearest to the object side. Therefore, it becomes difficult to make the numerical aperture large.

It is preferable that the following conditional expression (4') is satisfied instead of conditional expression (4).

$$1.1 \leq r_{1c}/r_{1i} \leq 1.5 \quad (4')$$

Moreover, in the objective according to the embodiment, it is preferable that the following conditional expression (5) is satisfied.

$$-0.013 \leq (n_{n1129} - n_{ns})/(n_{ns} - 1) \leq -0.0097 \quad (5)$$

where, $n_{n1129}$ denotes a refractive index at a wavelength 1129 nm of the lens having a negative refractive power, and $n_{ns}$ denotes a refractive index for an s-line (wavelength 852.11 nm) of the lens having a negative refractive power.

By satisfying conditional expression (5), glass with moderately large dispersion and moderately small partial dispersion is to be used as the lens having a negative refractive power. Therefore, it is possible to correct the chromatic aberration favorably in a wide range of the infrared region.

When exceeding an upper limit of conditional expression (5), either the dispersion in the lens having a negative refractive power becomes excessively small or the partial dispersion in the lens having a negative refractive power becomes excessively large. Therefore, it becomes difficult to correct the chromatic aberration favorably in the wide range of the infrared region.

When falling below a lower limit of conditional expression (5), either the dispersion in the lens having a negative refractive power becomes excessively large or the partial dispersion in the lens having a negative refractive power becomes excessively small. In this case, the correction of the chromatic aberration becomes easy. However, the refractive index of the lens having a negative refractive power is susceptible to becomes large. Therefore, it becomes difficult to use glass having a sufficient internal transmittance and a small strain as the lens having a negative refractive power.

It is preferable that the following conditional expression (5') is satisfied instead of conditional expression (5)

$$-0.011 \leq (n_{n1129} - n_{ns})/(n_{ns} - 1) \leq -0.0098 \quad (5')$$

Moreover, in the objective according to the embodiment, it is preferable that the following conditional expression (6) is satisfied.

$$0.29 \leq |(WD - d_1)/r_{1c}| \leq 0.48 \quad (6)$$

where,

WD denotes a working distance of the immersion microscope objective, $d_1$ denotes a thickness of the lens positioned nearest to the object side, and $r_{1c}$ denotes a radius of curvature of the cemented surface of the cemented lens in the first lens group.

By satisfying conditional expression (6), it is possible to suppress an aberration at a cemented surface of the cemented lens while securing the working distance of sufficient length. As a result, it is possible to achieve both of making the numerical aperture large and making the working distance long.

When exceeding an upper limit of conditional expression (6), the height of the light ray at the cemented surface of the cemented lens becomes high. Therefore, an aberration is susceptible to occur at a surface nearest to the image side of the cemented lens.

When falling below a lower limit of conditional expression (6), an aberration is susceptible to occur at the cemented surface of the cemented lens. Therefore, it becomes difficult to achieve both of making the numerical aperture large and making the working distance long.

In the objective having the correction ring, the working distance change according to the position of the correction ring. In such objective, it is preferable that conditional expression (6) is satisfied for all the working distances.

It is preferable that the following conditional expression (6') is satisfied instead of conditional expression (6).

$$0.3 \leq |(WD - d_1)/r_{1c}| \leq 0.45 \quad (6')$$

Moreover, in the objective according to the embodiment, it is preferable that the second lens group includes a movable lens group which moves along an optical axis, and the following conditional expressions (7) and (8) are satisfied.

$$-1.1 \leq m_{g2} \leq -0.8 \quad (7)$$

$$-0.3 \leq f/f_{2m} \leq 0 \quad (8)$$

where, $m_{g2}$ denotes a magnification of the second lens group, f denotes a focal length of the immersion microscope objective, and $f_{2m}$ denotes a focal length of the movable lens group.

The second lens group includes the movable lens group. When the magnification of the movable lens group is close to one time or minus one time, a paraxial position of a focal position does not change even when the lens group is moved. Therefore, it becomes possible to carry out the aberration correction easily by moving the lens group. Particularly, in an objective with a long working distance and a large amount of aberration correction, the change in the focal position due to the movement of the lens group is susceptible to be large. By satisfying conditional expression (7), the change in the focal position due to the movement of the lens group becomes small. Therefore, it is possible to realize an objective with a superior operability and aberration correction performance.

When exceeding an upper limit of conditional expression (7), or when falling below a lower limit of conditional expression (7), since the change in the focal position due to the movement of the lens group becomes large, the operability is degraded, and also it is not possible to carry out the correction of the spherical aberration sufficiently.

Conditional expression (8) indicates that the refractive power of the moving lens group is negative. In a lens group having a positive refractive power, the height of a light ray is high as compared to the height in a lens group having a negative refractive power. Therefore, when the lens group having a positive refractive power is moved, an occurrence of aberration due to the movement becomes large. Particularly in a case in which, the amount of correction of the spherical aberration is large, a lens group having a negative refractive power is suitable for the movable lens group. By satisfying conditional expression (8), a fluctuation in various aberrations other than the spherical aberration can be suppressed.

When exceeding an upper limit of conditional expression (8), the negative refractive power of the object-side lens surface of the movable lens group becomes excessively large. In this case, the height of a light ray in the movable lens group is raised up. Therefore, correction of the spherical aberration due to the movement of the movable lens group becomes difficult. Moreover, the spherical aberration of high order and the coma of high order are susceptible to occur at the object-side lens surface.

When falling below a lower limit of conditional expression (8), the height of a light ray in the second lens group becomes excessively low. In this case, a light beam emerged from the second lens group is susceptible to be diverged. Therefore, correction of the coma becomes difficult.

It is preferable that the following conditional expression (7') is satisfied instead of conditional expression (7).

$$-1.05 \leq m_{g2} \leq -0.85 \quad (7')$$

Moreover, it is preferable that the following conditional expression (8') is satisfied instead of conditional expression (8).

$$-0.28 \leq f/f_{2m} \leq -0.05 \quad (8')$$

An immersion microscope objective according to a third embodiment enables to observe up to a deep portion in an infrared wavelength region, and the chromatic aberration is corrected in the infrared wavelength region of wavelength from 800 nm up to 1300 nm.

By making such an arrangement, it is possible to correct the chromatic aberration favorably in a wide range of the infrared region.

Moreover, a microscope according to an embodiment includes a scanner section, a main-body section, and a microscope objective, and one of the abovementioned immersion microscope objectives is used as the microscope objective.

By making such an arrangement, it is possible to realize a microscope which enables favorable observation of a sample and, an image pickup thereof.

Examples of the immersion microscope objective according to the present invention will be described below in detail by referring the accompanying diagrams. However, the present invention is not restricted to the examples described below.

Figure 2:
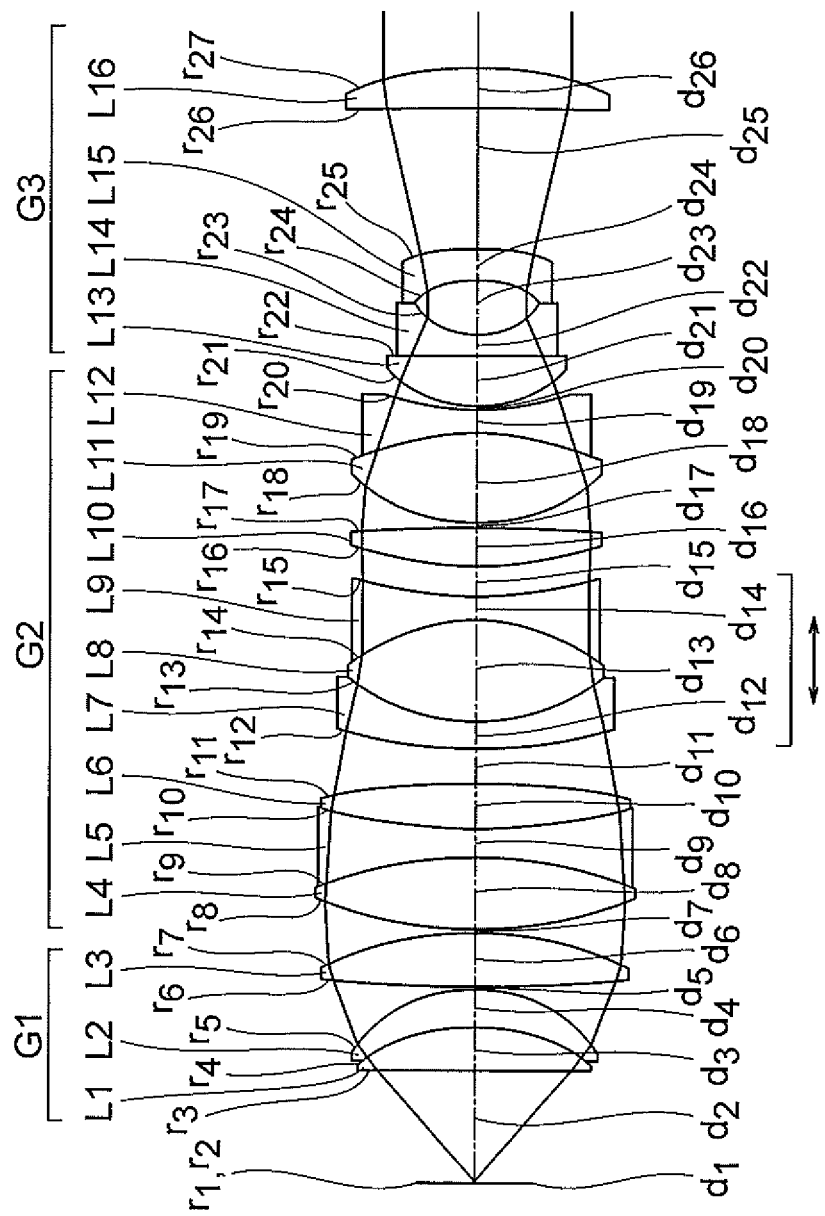
FIG. 2 is a cross-sectional view along an optical axis, showing an optical arrangement of an immersion microscope objective according to an example 2 of the present invention.
Figure 3:
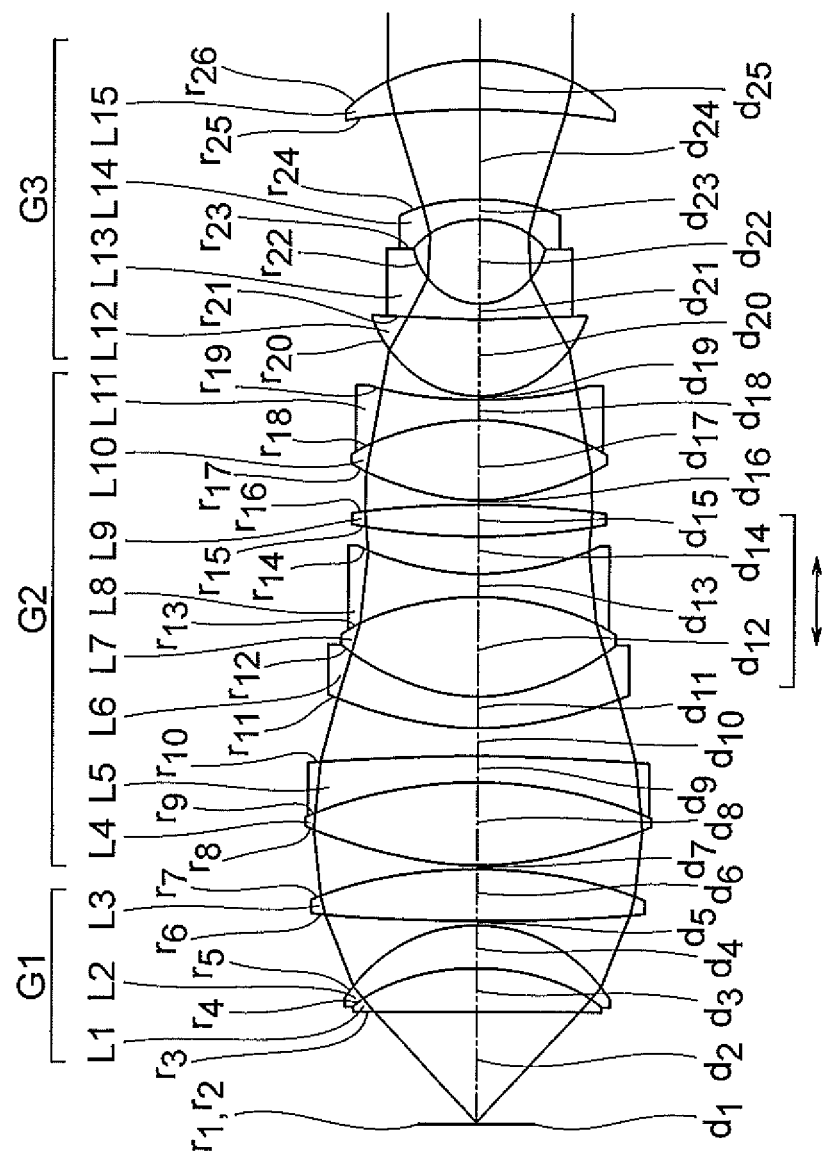
FIG. 3 is a cross-sectional view along an optical axis showing an optical arrangement of an immersion microscope objective according to an example 3 of the present invention.
Figure 11:
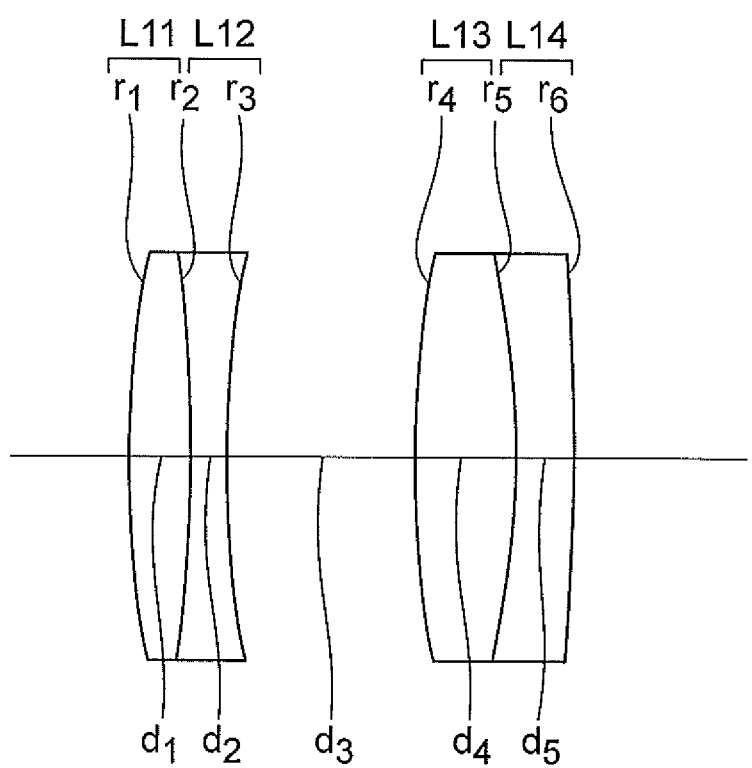
FIG. 11 is a cross-sectional view of a tube lens.

An example 1, an example 2, and an example 3 of the immersion microscope objective according to the present invention will be described below. Cross-sectional views along an optical axis showing an optical arrangement of the immersion microscope objective according to the example 1, the example 2, and the example 3 are shown in FIG. 1, FIG. 2, and FIG. 3. In these cross-sectional views, reference numerals L1 to L6 denote lenses. Moreover, FIG. 11 is a cross-sectional view of a tube lens.

The immersion microscope objective lenses of the examples from the first example to the third example are infinity-corrected microscope objectives. In an infinity-corrected microscope objective, since a bundle of rays which is emerged from the microscope objective becomes parallel, image is not formed in itself. Therefore, the parallel bundle of rays is converged by a tube lens as shown in FIG. 11. Moreover, an image of a sample surface is formed at a position at which the parallel bundle of rays is converged.

Each of the conditional expressions may be used independently or may be used freely in combination with another conditional expression, and will show an effect of the present invention. Moreover, conditional expressions may be the expressions in which an upper limit value and a lower limit value of a conditional expression are changed independently, and which show the effect of the present invention similarly.

Next, an objective according to the example 1 will be described below. The objective according to the example 1, as shown in FIG. 1, includes in order from an object side, a first lens group G1, a second lens group G2, and a third lens group G3.

The first lens group G1 has a positive refractive power, and includes in order from the object side, a planoconvex positive lens L1, a positive meniscus lens L2 having a convex surface directed toward an image side, and a biconvex positive lens L3. Here, the planoconvex positive lens L1 and the positive meniscus lens L2 are cemented.

The second lens group G2 has a positive refractive power, and includes in order from the object side, a biconvex positive lens L4, a negative meniscus lens L5 having a convex surface directed toward the image side, a negative meniscus lens L6 having a convex surface directed toward the object side, a biconvex positive lens L7, a biconcave negative lens L8, a biconvex positive lens L9, a biconvex positive lens L10, and a biconcave negative lens L11. Here, the biconvex positive lens L4 and the negative meniscus lens L5 are cemented. Moreover, the negative meniscus lens L6, the biconvex positive lens L7, and the biconcave negative lens L8 are cemented. Moreover, the biconvex positive lens L10 and the biconcave negative lens L11 are cemented. The second lens group G2 has a positive refractive power as a whole, and changes a divergent light beam to a convergent light beam.

The third lens group G3 has a negative refractive power, and includes in order from the object side, a positive meniscus lens L12 having a convex surface directed toward the object side, a negative meniscus lens L13 having a convex surface directed toward the object side, a negative meniscus lens L14 having a convex surface directed toward the image side, and a positive meniscus lens L15 having a convex surface directed toward the image side. Here, the positive meniscus lens L12 and the negative meniscus lens L13 are cemented. The third lens group G3 has a negative refractive power as a whole, and changes a convergent light beam to a substantially parallel light beam.

Moreover, the third lens group G3 includes an object-side lens group and an image-side lens group. The object-side lens group includes a cemented lens (the positive meniscus lens L12 and the negative meniscus lens L13). In the cemented lens, a surface nearest to the image side (an image-side surface of the negative meniscus lens L13) is a concave surface which is directed toward the image side. Moreover, the image-side lens group includes the negative meniscus lens L14 and the positive meniscus lens L15. In the negative meniscus lens L14, a surface nearest to the object side is a concave surface which is directed toward a sample plane.

The lenses having a positive refractive power which satisfy conditional expression (1) are, the biconvex positive lens L3, the biconvex positive lens L4, the biconvex positive lens L7, the biconvex positive lens L9, and the biconvex positive lens L10.

The lenses having a positive refractive power which satisfy conditional expression (2) are, the biconvex positive lens L3, the biconvex positive lens L4, the biconvex positive lens L9, the biconvex positive lens L10, and the positive meniscus lens L12.

Moreover, the number of cemented surfaces of the lens having a positive refractive power and the lens having a negative refractive power which satisfy conditional expressions (1) and (2) is two.

The lenses having a negative refractive power which satisfy conditional expression (5) are, the negative meniscus lens L5, the negative meniscus lens L6, the biconcave negative lens L8, the biconcave negative lens L11, and the negative meniscus lens L13.

None of the first lens group G1, the second lens group G2, and the third lens group G3 moves (positions thereof are fixed).

Next, an objective according to the example 2 will be described below. The objective according to the example 2, as shown in FIG. 2, includes in order from an object side, a first lens group G1, a second lens group G2, and a third lens group G3.

The first lens group G1 has a positive refractive power, and includes in order from the object side, a planoconvex positive lens L1, a positive meniscus lens L2 having a convex surface directed toward an image side, and a biconvex positive lens L3. Here, the planoconvex positive lens L1 and the positive meniscus lens L2 are cemented.

The second lens group G2 has a positive refractive power, and includes in order from the object side, a biconvex positive lens L4, a biconcave negative lens L5, a biconvex positive lens L6, a negative meniscus lens L7 having a convex surface directed toward the object side, a biconvex positive lens L8, a biconcave negative lens L9, a biconvex positive lens L10, a biconvex positive lens L11, and a biconcave negative lens L12. Here, in a cemented lens on the object side, the biconvex positive lens L4, the biconcave negative lens L5, and the biconvex positive lens L6 are cemented. Moreover, in a cemented lens at the center, the negative meniscus lens L7, the biconvex positive lens L8, and the biconcave negative lens L9 are cemented. In a cemented lens on the image side, the biconvex positive lens L11 and the biconcave negative lens L12 are cemented. The second lens group G2 has a positive refractive power as a whole, and changes a divergent light beam to a convergent light beam.

The third lens group G3 has a negative refractive power, and includes in order from the object side, a planoconvex positive lens L13, a planoconcave negative lens L14, a negative meniscus lens L15 having a convex surface directed toward the image side, and a planoconvex positive lens L16. Here, the planoconvex positive lens L13 and the planoconcave negative lens L14 are cemented. The third lens group G3 has a negative refractive power as a whole, and changes a convergent light beam to a substantially parallel light beam.

Moreover, the third lens group G3 includes an object-side lens group and an image-side lens group. The object-side lens group includes a cemented lens (the planoconvex positive lens L13 and the planoconcave negative lens L14). In the cemented lens, a surface nearest to the image side (an image-side surface of the planoconcave negative lens L14) is a concave surface which is directed toward the image side. Moreover, the image-side lens group includes the negative meniscus lens L15 and the planoconvex positive lens L16. In the negative meniscus lens L15, a surface nearest to the object side is a concave surface which is directed toward a sample plane.

The lenses having a positive refractive power which satisfy conditional expression (1) are, the biconvex positive lens L3, the biconvex positive lens L4, the biconvex positive lens L6, the biconvex positive lens L8, the biconvex positive lens L10, and the biconvex positive lens L11.

The lenses having a positive refractive power which satisfy conditional expression (2) are, the biconvex positive lens L3, the biconvex positive lens L4, the biconvex positive lens L6, the biconvex positive lens L10, the biconvex positive lens L11, and the planoconvex positive lens L13.

Moreover, the number of cemented surfaces of the lens having a positive refractive power and the lens having a negative refractive power which satisfy conditional expressions (1) and (2) is three.

The lenses having a negative refractive power which satisfy conditional expression (5) are, the biconcave negative lens L5, the negative meniscus lens L7, the biconcave negative lens L9, the biconcave negative lens L12, and the negative meniscus lens L15.

None of the first lens group G1 and the third lens group G3 moves (positions thereof are fixed). Whereas, in the second lens group G2, the cemented lens on the image side moves along an optical axis.

Next, an objective according to the example 3 will be described below. The objective according to the example 3, as shown in FIG. 3, includes in order from the object side, a first lens group G1, a second lens group G2, and a third lens group G3.

The first lens group G1 has a positive refractive power, and includes in order from the object side, a planoconvex positive lens L1, a positive meniscus lens L2 having a convex surface directed toward an image side, and a biconvex positive lens L3. Here, the planoconvex positive lens L1 and the positive meniscus lens L2 are cemented.

The second lens group G2 has a positive refractive power, and includes in order from the object side, a biconvex positive lens L4, a negative meniscus lens L5 having a convex surface directed toward an image side, a negative meniscus lens L6 having a convex surface directed toward the object side, a biconvex positive lens L7, a biconcave negative lens L8, a biconvex positive lens L9, a biconvex positive lens L10, and a biconcave negative lens L11. Here, in a cemented lens on the object side, the biconvex positive lens L4 and the negative meniscus lens L5 are cemented. Moreover, in a cemented lens at the center, the negative meniscus lens L6, the biconvex positive lens L7, and the biconcave negative lens L8 are cemented. In a cemented lens on the image side, the biconvex positive lens L10 and the biconcave negative lens L11 are cemented. The second lens group G2 has a positive refractive power as a whole, and changes a divergent light beam to a convergent light beam.

The third lens group G3 has a negative refractive power, and includes in order from the object side, a positive meniscus lens L12 having a convex surface directed toward the object side, a negative meniscus lens L13 having a convex surface directed toward the object side, a negative meniscus lens L14 having a convex surface directed toward an image side, and a positive meniscus lens L15 having a convex surface directed toward the image side. Here, the positive meniscus lens L12 and the negative meniscus lens L13 are cemented. The third lens group G3 has a negative refractive power as a whole, and changes a convergent light beam to a substantially parallel light beam.

Moreover, the third lens group G3 includes an object-side lens group and an image-side lens group. The object-side lens group includes a cemented lens (the positive meniscus lens L12 and the negative meniscus lens L13). In the cemented lens, a surface nearest to the image side (an image-side surface of the biconcave negative lens L11) is a concave surface which is directed toward the image side. Moreover, the image-side lens group includes the negative meniscus lens L14 and the positive meniscus lens L15. In the negative meniscus lens L14, a surface nearest to the object side is a concave surface which is directed toward a sample plane.

The lenses having a positive refractive power which satisfy conditional expression (1) are, the biconvex positive lens L3, the biconvex positive lens L4, the biconvex positive lens L7, the biconvex positive lens L9, the biconvex positive lens L10, and the positive meniscus lens L12.

The lenses having a positive refractive power, which satisfy conditional expression (2) are, the biconvex positive lens L3, the biconvex positive lens L4, the biconvex positive lens L9, the biconvex positive lens L10, and the positive meniscus lens L12.

Moreover, the number of cemented surfaces of the lens having a positive refractive power and the lens having a negative refractive power which satisfy conditional expressions (1) and (2) is three.

The lenses having a negative refractive power which satisfy conditional expression (5) are, the negative meniscus lens L5, the negative meniscus lens L6, the biconcave negative lens L8, the biconcave negative lens L11, and the negative meniscus lens L13.

None of the first lens group G1 and the third lens group G3 moves (position thereof are fixed). Whereas, in the second lens group G2, the cemented lens at the center moves along an optical axis.

Next, numerical data of optical members forming the objective of the abovementioned examples is given below. In the numerical data for each example, r denotes a radius of curvature of each lens surface (however, r1 and r2 are virtual surfaces), d denotes a thickness of each lens or an air space (however, d1 denotes a thickness of a cover glass, and d2 denotes a thickness of an immersion liquid layer), n900 denotes the refractive index of each lens at the wavelength 900 nm, ns denotes the refractive index of each lens for an s-line, n1129 denotes the refractive index of each lens at the wavelength 1129 nm, nd denotes the refractive index of each lens for a d-line, νd denotes Abbe's number for each lens, NA denotes the numerical aperture, f denotes a focal length of the overall objective, and β denotes magnification. The magnification β is a magnification when combined with a tube lens that will be described later (focal length 180 mm).

In the numerical data, a case in which, a value of d1 is zero, indicates a state in which no cover glass exists between a sample and the objective. In this state, an image of the sample is formed via an immersion liquid. Moreover, in this case, both the virtual surfaces r1 and r2 indicate a boundary between the immersion liquid and the sample plane.

Whereas, in a case in which, the value of d1 is not zero, indicates a state in which the cover glass exists between the sample and the objective. In this state, an image of the sample is formed via the cover glass and the immersion liquid. Moreover, in this case, the virtual surface r1 indicates a boundary between the sample plane and the cover glass, and the virtual surface r2 indicates a boundary between the cover glass and the immersion liquid. If the cover glass is regarded as a sample, the virtual surface r2 becomes the boundary between the immersion liquid and the sample plane, and the virtual surface r1 becomes an interior of the sample. This makes it evident that it is possible to observe the interior of the sample.

In the objective of the example 2, a favorable image of the sample is achieved irrespective of the presence or absence of the cover glass, and a change in the type of the immersion liquid. Therefore, in the objective of the example 2, the second lens group includes a moving lens group. Similarly, in the objective of the example 3, the second lens group includes a moving lens group.

Surface data in a numerical example 2 and a numerical example 3 is surface data when in the state 1. A difference between the state 1, the state 2, and the state 3 is as follows. Moreover, numerical values for each of the state 1, the state 2, and the state 3 are shown in a column of various data. Also, a unit of radius of curvature r and surface separation d are millimeter (mm).

|  | cover glass | immersion liquid |
|---|---|---|
| State 1 | absence | liquid A |
| State 2 | absence | liquid B |
| State 3 | presence | liquid C |

Example 1

NA = 0.95, f = 7.2064 mm, β = −24.996
Surface data

| No. | r | d | n900 | ns | n1129 | nd | νd |
|---|---|---|---|---|---|---|---|
| 1 | ∞ | 0 | | | | | |
| 2 | ∞ | 8.05 | 1.37174 | 1.37256 | 1.36825 | 1.37919 | 52.4 |
| 3 | ∞ | 3.3000 | 1.45182 | 1.45253 | 1.44894 | 1.4585 | 67.83 |
| 4 | −15.503 | 3.5043 | 1.86397 | 1.86572 | 1.85776 | 1.883 | 40.76 |
| 5 | −10.9366 | 0.2 | | | | | |
| 6 | 70.9239 | 4.723 | 1.58713 | 1.58791 | 1.58426 | 1.59522 | 67.74 |
| 7 | −28.9945 | 0.2 | | | | | |
| 8 | 33.6542 | 8.2116 | 1.52216 | 1.52278 | 1.51982 | 1.52855 | 76.98 |
| 9 | −18.8907 | 2 | 1.62408 | 1.6254 | 1.6191 | 1.63775 | 42.41 |
| 10 | −72.4466 | 0.4898 | | | | | |
| 11 | 27.0592 | 2.2 | 1.62408 | 1.6254 | 1.6191 | 1.63775 | 42.41 |
| 12 | 12.5744 | 8 | 1.43436 | 1.4348 | 1.43269 | 1.43875 | 94.93 |
| 13 | −19.6835 | 1.7000 | 1.71843 | 1.72021 | 1.71215 | 1.7380 | 32.26 |
| 14 | 25.8438 | 0.1993 | | | | | |
| 15 | 26.0963 | 3.1916 | 1.58713 | 1.58791 | 1.58426 | 1.5952 | 67.74 |
| 16 | −114.2664 | 0.25 | | | | | |
| 17 | 18.0405 | 4.1529 | 1.58713 | 1.58791 | 1.58426 | 1.59522 | 67.74 |
| 18 | −154.8247 | 1.5 | 1.65754 | 1.65897 | 1.65237 | 1.673 | 38.15 |
| 19 | 20.3617 | 0.25 | | | | | |
| 20 | 7.8324 | 4.8473 | 1.59433 | 1.59519 | 1.59103 | 1.603 | 65.44 |
| 21 | 12.1045 | 1.2 | 1.71843 | 1.72021 | 1.71215 | 1.738 | 32.26 |
| 22 | 4.7298 | 7.6818 | | | | | |
| 23 | −6.4614 | 1.4993 | 1.78837 | 1.78986 | 1.78284 | 1.804 | 46.57 |
| 24 | −15.0028 | 7.481 | | | | | |
| 25 | −28.8551 | 3.4221 | 1.71843 | 1.72021 | 1.71215 | 1.738 | 32.26 |
| 26 | −12.9992 | | | | | | |

Example 2

NA = 0.9, f = 7.223 mm, β = −25.001
Surface data

| No. | r | d | n900 | ns | n1129 | nd | νd |
|---|---|---|---|---|---|---|---|
| 1 | ∞ | 0 | | | | | |
| 2 | ∞ | 8.05 | 1.37174 | 1.37256 | 1.36825 | 1.37919 | 52.4 |
| 3 | ∞ | 3 | 1.45182 | 1.45253 | 1.44894 | 1.45852 | 67.83 |
| 4 | −15.503 | 2.8 | 1.86397 | 1.86572 | 1.85776 | 1.883 | 40.76 |
| 5 | −10.6423 | 0.2 | | | | | |
| 6 | 159.1998 | 3.8057 | 1.58713 | 1.58791 | 1.58426 | 1.59522 | 67.74 |
| 7 | −24.9831 | 0.2 | | | | | |
| 8 | 30.7784 | 5.1456 | 1.58713 | 1.58791 | 1.58426 | 1.59522 | 67.74 |
| 9 | −30.2878 | 1.97 | 1.65754 | 1.65897 | 1.65237 | 1.673 | 38.15 |
| 10 | 41.5763 | 3.3218 | 1.58713 | 1.58791 | 1.58426 | 1.59522 | 67.74 |
| 11 | −58.5863 | (Variable) | | | | | |
| 12 | 35.2975 | 1.95 | 1.65754 | 1.65897 | 1.65237 | 1.673 | 38.15 |
| 13 | 14.4557 | 7.2883 | 1.43436 | 1.4348 | 1.43269 | 1.43875 | 94.93 |
| 14 | −14.4557 | 1.75 | 1.65754 | 1.65897 | 1.65237 | 1.673 | 38.15 |
| 15 | 32.7726 | (Variable) | | | | | |

-continued

| NA = 0.9, f = 7.223 mm, β = −25.001 Surface data |||||||
|---|---|---|---|---|---|---|
| No. | r | d | n900 | ns | n1129 | nd | vd |
| 16 | 30.1295 | 2.7279 | 1.56178 | 1.56248 | 1.5592 | 1.56907 | 71.3 |
| 17 | −134.1343 | 0.25 | | | | | |
| 18 | 12.7389 | 6.5092 | 1.58713 | 1.58791 | 1.58426 | 1.59522 | 67.74 |
| 19 | −20.7032 | 1.75 | 1.60085 | 1.60206 | 1.59633 | 1.6134 | 44.27 |
| 20 | 20.2108 | 0.25 | | | | | |
| 21 | 9.0084 | 3.5502 | 1.59433 | 1.59519 | 1.59103 | 1.603 | 65.44 |
| 22 | ∞ | 1.5 | 1.78837 | 1.78986 | 1.78284 | 1.804 | 46.57 |
| 23 | 5.0183 | 3.9824 | | | | | |
| 24 | −6.0016 | 2.2 | 1.65754 | 1.65897 | 1.65237 | 1.673 | 38.15 |
| 25 | −17.5334 | 10.1237 | | | | | |
| 26 | ∞ | 2.9808 | 1.71843 | 1.72021 | 1.71215 | 1.738 | 32.26 |
| 27 | −23.0792 | | | | | | |

Various Data

State 1

| | d | n900 | ns | n1129 | nd | vd |
|---|---|---|---|---|---|---|
| d1 | 0 | | | | | |
| d2 | 8.05 | 1.37174 | 1.37256 | 1.36825 | 1.37919 | 52.4 |
| d11 | 2.4361 | | | | | |
| d15 | 2.0921 | | | | | |

State 2

| | d | n900 | ns | n1129 | nd | vd |
|---|---|---|---|---|---|---|
| d1 | 0 | | | | | |
| d2 | 7.78359 | 1.32666 | 1.3274 | 1.32342 | 1.33304 | 55.79 |

-continued

State 2

| | d | n900 | ns | n1129 | nd | vd |
|---|---|---|---|---|---|---|
| d11 | 0.40991 | | | | | |
| d15 | 4.11833 | | | | | |

State 3

| | d | n900 | ns | n1129 | nd | vd |
|---|---|---|---|---|---|---|
| d1 | 0.23 | 1.51497 | 1.51587 | 1.51215 | 1.52396 | 54.41 |
| d2 | 7.98534 | 1.39737 | 1.39799 | 1.39523 | 1.4042 | 52.02 |
| d11 | 3.77834 | | | | | |
| d15 | 0.74990 | | | | | |

Example 3

| NA = 0.95, f = 7.223 mm, β = −25.001 Surface data |||||||
|---|---|---|---|---|---|---|
| No. | r | d | n900 | ns | n1129 | nd | vd |
| 1 | ∞ | 0 | | | | | |
| 2 | ∞ | 8.05 | 1.37174 | 1.37256 | 1.36825 | 1.37919 | 52.40 |
| 3 | ∞ | 3.3000 | 1.45182 | 1.45253 | 1.44894 | 1.4585 | 67.83 |
| 4 | −15.503 | 3.2744 | 1.86397 | 1.86572 | 1.85776 | 1.883 | 40.76 |
| 5 | −10.8669 | 0.2 | | | | | |
| 6 | 122.215 | 3.8912 | 1.58713 | 1.58791 | 1.58426 | 1.59522 | 67.74 |
| 7 | −32.1014 | 0.2 | | | | | |
| 8 | 27.265 | 6.1621 | 1.58713 | 1.58791 | 1.58426 | 1.59522 | 67.74 |
| 9 | −29.4419 | 2 | 1.62408 | 1.6254 | 1.6191 | 1.63775 | 42.41 |
| 10 | −101.0096 | (Variable) | | | | | |
| 11 | 25.7867 | 2.2 | 1.62408 | 1.6254 | 1.6191 | 1.63775 | 42.41 |
| 12 | 14.1247 | 8 | 1.43436 | 1.4348 | 1.43269 | 1.43875 | 94.93 |
| 13 | −18.2013 | 1.7000 | 1.71843 | 1.72021 | 1.71215 | 1.7380 | 32.26 |
| 14 | 19.097 | (Variable) | | | | | |
| 15 | 47.5661 | 2.4694 | 1.58713 | 1.58791 | 1.58426 | 1.5952 | 67.74 |
| 16 | −60.7093 | 0.25 | | | | | |
| 17 | 17.1062 | 5.855 | 1.58713 | 1.58791 | 1.58426 | 1.59522 | 67.74 |
| 18 | −17.7957 | 1.5 | 1.65754 | 1.65897 | 1.65237 | 1.673 | 38.15 |
| 19 | 33.676 | 0.25 | | | | | |
| 20 | 7.979 | 5.7162 | 1.58713 | 1.58791 | 1.58426 | 1.59522 | 67.74 |
| 21 | 70.8221 | 1.2 | 1.71843 | 1.72021 | 1.71215 | 1.738 | 32.26 |
| 22 | 4.7288 | 6.3016 | | | | | |
| 23 | −6.2016 | 1.4288 | 1.78837 | 1.78986 | 1.78284 | 1.804 | 46.57 |
| 24 | −15.8568 | 6.7766 | | | | | |
| 25 | −49.1597 | 3.702 | 1.71843 | 1.72021 | 1.71215 | 1.738 | 32.26 |
| 26 | −14.2057 | | | | | | |

Various Data

State 1

| | d | n900 | ns | n1129 | nd | vd |
|---|---|---|---|---|---|---|
| d1 | 0 | | | | | |
| d2 | 8.05 | 1.37174 | 1.37256 | 1.36825 | 1.37919 | 52.4 |
| d10 | 2.10907 | | | | | |
| d14 | 2.78783 | | | | | |

State 2

| | d | n900 | ns | n1129 | nd | vd |
|---|---|---|---|---|---|---|
| d1 | 0 | | | | | |
| d2 | 7.7636 | 1.32666 | 1.3274 | 1.32342 | 1.33304 | 54.4 |
| d10 | 0.48984 | | | | | |
| d14 | 4.40706 | | | | | |

State 3

| | d | n900 | ns | n1129 | nd | vd |
|---|---|---|---|---|---|---|
| d1 | 0.23 | 1.51497 | 1.51587 | 1.51215 | 1.52396 | 54.41 |
| d2 | 7.99800 | 1.39737 | 1.39799 | 1.39523 | 1.4042 | 52.02 |
| d10 | 3.15900 | | | | | |
| d14 | 1.73789 | | | | | |

Tube Lens

Surface data

| No. | r | d | n900 | ns | n1129 | nd | vd |
|---|---|---|---|---|---|---|---|
| 1 | 95.2596 | 5.3317 | 1.56907 | 1.56395 | 1.5592 | 1.56907 | 71.3 |
| 2 | −116.2766 | 2.8267 | 1.50847 | 1.50296 | 1.49723 | 1.50847 | 61.19 |
| 3 | 80.4059 | 16.3504 | | | | | |
| 4 | 92.0498 | 8.7567 | 1.48749 | 1.48282 | 1.47778 | 1.48749 | 70.23 |
| 5 | −73.2447 | 4.8745 | 1.62408 | 1.62540 | 1.61910 | 1.63775 | 42.41 |
| 6 | −292.408 | | | | | | |

Unit focal length 180 mm

FIG. 4A, FIG. 4B, FIG. 4C, FIG. 4D (hereinafter, 'FIG. 4A to FIG. 4D') to FIG. 10A, FIG. 10B, FIG. 10C, and FIG. 10D (hereinafter, FIG. 10A to FIG. 10D) are aberration diagrams of the objectives according to the example 1, the example 2, and the example 3, and are aberration diagrams in the following states.

| | Example | State |
|---|---|---|
| FIG. 4A to FIG. 4D | Example 1 | State 1 |
| FIG. 5A to FIG. 5D | Example 2 | State 1 |
| FIG. 6A to FIG. 6D | Example 2 | State 2 |
| FIG. 7A to FIG. 7D | Example 2 | State 3 |
| FIG. 8A to FIG. 8D | Example 3 | State 1 |
| FIG. 9A to FIG. 9D | Example 3 | State 2 |
| FIG. 10A to FIG. 10D | Example 3 | State 3 |

Moreover, in these aberration diagrams, 'IM.H' (unit: mm) denotes an image height. FIG. 4A, FIG. 5A, FIG. 6A, FIG. 7A, FIG. 8A, FIG. 9A, and FIG. 10A show a spherical aberration (SA), FIG. 4B, FIG. 5B, FIG. 6B, FIG. 7B, FIG. 8B, FIG. 9B, and FIG. 10B show an offense against the sine condition (OSC), FIG. 4C, FIG. 5C, FIG. 6C, FIG. 7C, FIG. 8C, FIG. 9C, and FIG. 10C show an astigmatism (AS), and FIG. 4D, FIG. 5D, FIG. 6D, FIG. 7D, FIG. 8D, FIG. 9D, and FIG. 10D show a coma (DZY)

Figure 12:
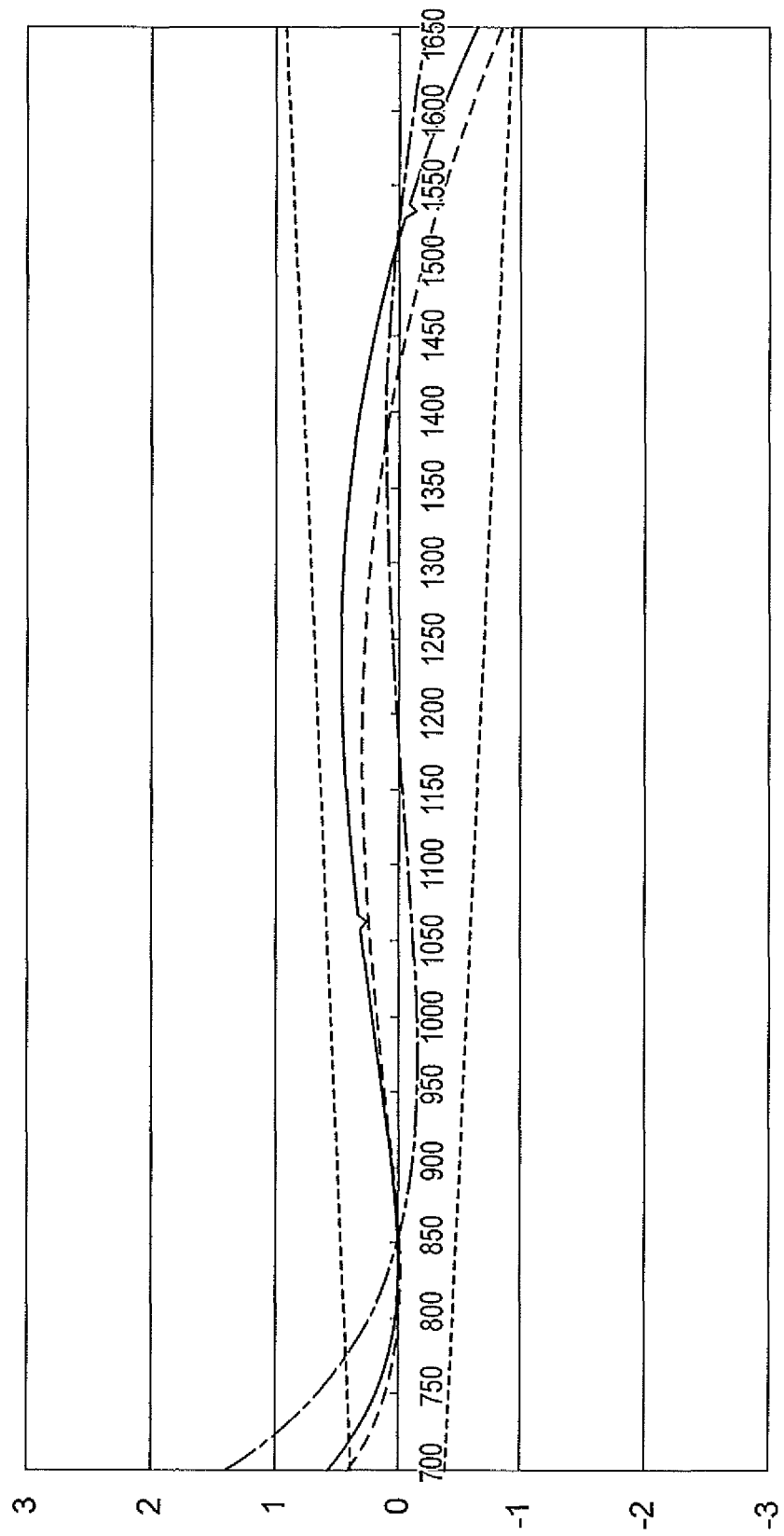
FIG. 12 is a diagram showing an amount of chromatic aberration occurring in the immersion microscope objective of the examples.

Moreover, an amount of the chromatic aberration occurring in the objective in the present example is shown in FIG. 12. In FIG. 12, a vertical axis of a graph is a distance (unit: μm), the focal position is '0', and a horizontal axis is a wavelength (unit: nm). Moreover, dotted lines show upper limit values and lower limit values of a focal depth, and a solid line, a broken line and a chain line show an amount of chromatic aberration occurred in the three objectives. Each of these three objectives is the objectives of the present examples.

As shown in FIG. 12, in a range from approximately 800 nm and more, both the solid line and the broken line are positioned at an inner side of the upper limit values and the lower limit values shown by the dotted lines. This indicates that, in the objective of the present example, the chromatic aberration has been corrected favorably in a wide range of the infrared region. In FIG. 12, the graph is only for the wavelength up to 1635 nm, and the amount of the chromatic aberration occurred is within the focal depth at least for the wavelength of up to 1650 nm.

Next, the values of conditional expressions (1) to (6) in each example are shown below.

| Conditional expressions | | Example 1 | | Example 2 | | Example 3 |
|---|---|---|---|---|---|---|
| (1) $(n_{p1129} - n_{ps})/(n_{ps} - 1)$ | L3 | −0.006 | L3 | −0.006 | L3 | −0.006 |
| | L4 | −0.006 | L4 | −0.006 | L4 | −0.006 |
| | L7 | −0.005 | L6 | −0.006 | L7 | −0.005 |
| | L9 | −0.006 | L8 | −0.005 | L9 | −0.006 |
| | L10 | −0.006 | L10 | −0.006 | L10 | −0.006 |
| | | | L11 | −0.006 | L12 | −0.006 |
| (2) $1/n_{ps}$ | L3 | 0.630 | L3 | 0.630 | L3 | 0.630 |
| | L4 | 0.657 | L4 | 0.630 | L4 | 0.630 |
| | L9 | 0.630 | L6 | 0.630 | L9 | 0.630 |
| | L10 | 0.630 | L10 | 0.640 | L10 | 0.630 |
| | L12 | 0.627 | L11 | 0.630 | L12 | 0.630 |
| | | | L13 | 0.627 | | |
| (3) $d_1/WD$ Condition 1 | | | | 0.410 | | 0.373 | | 0.407 |
| Condition 2 | | | | | 0.385 | | 0.425 |
| Condition 3 | | | | | 0.365 | | 0.398 |
| (4) $r_{1c}/r_{1i}$ | | | 1.418 | | 1.457 | | 1.427 |
| (5) $(n_{n1129} - n_{ns})/(n_{ns} - 1)$ | L5 | −0.010 | L5 | −0.010 | L5 | −0.010 |
| | L6 | −0.010 | L7 | −0.010 | L6 | −0.010 |
| | L8 | −0.011 | L9 | −0.010 | L8 | −0.011 |
| | L11 | −0.010 | L12 | −0.010 | L11 | −0.010 |
| | L13 | −0.011 | L15 | −0.010 | L13 | −0.010 |
| (6) $(WD - d_1)/r_{1c}$ Condition 1 | | 0.306 | | 0.326 | | 0.308 |
| Condition 2 | | | | 0.309 | | 0.288 |
| Condition 3 | | | | 0.337 | | 0.320 |
| (7) $m_{g2}$ | | — | | −1.014 | | 0.860 |
| (8) $f/f_{2m}$ | | — | | −0.222 | | −0.269 |

Figure 13:
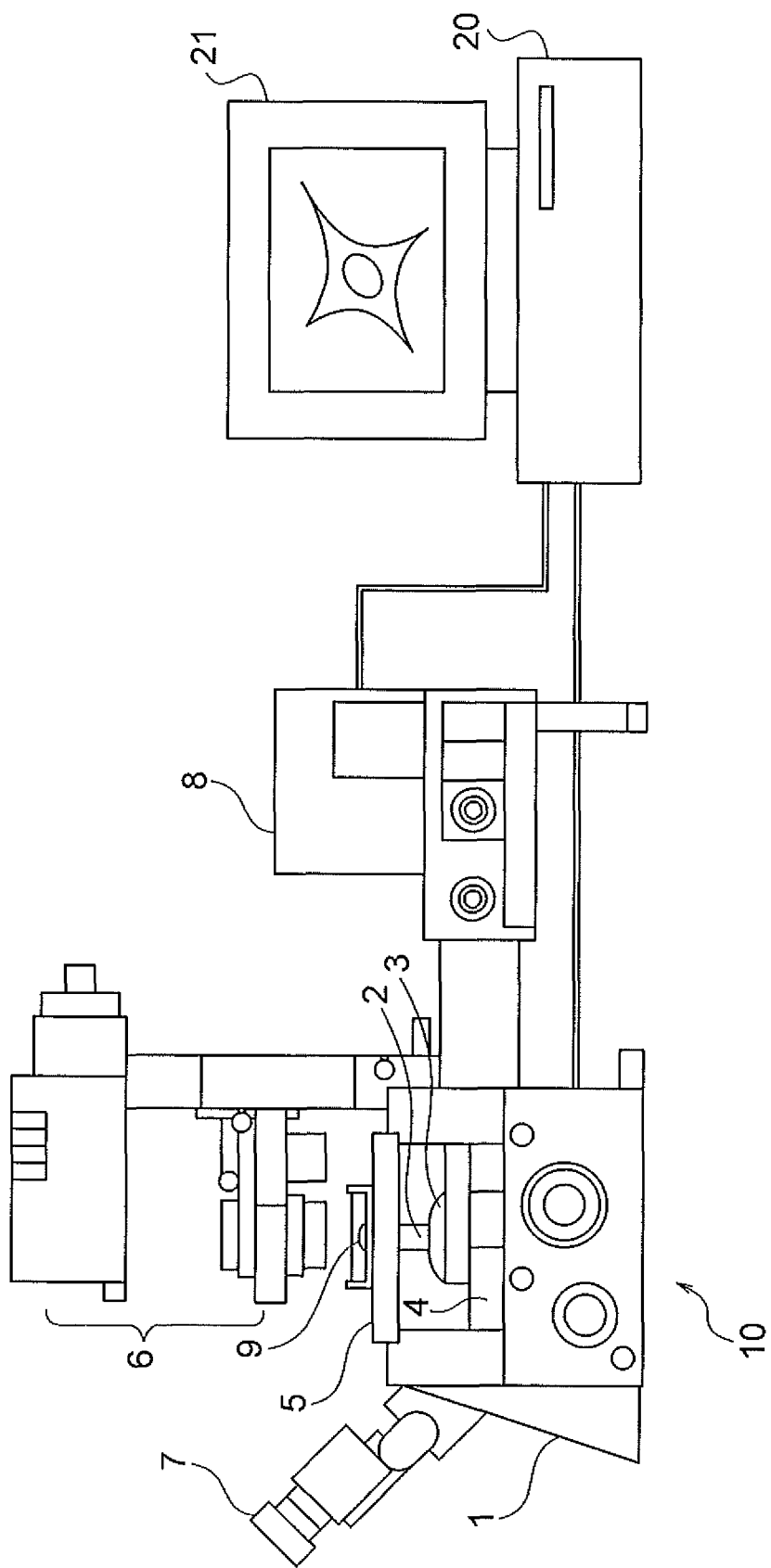
FIG. 13 is a diagram of a microscope in which, the immersion microscope objective of the present invention is used.

FIG. 13 is a diagram showing the microscope according to the present embodiment. In FIG. 13, an example of an external structure of a laser scanning confocal microscope is shown as an example of the microscope. As shown in FIG. 13, a microscope 10 includes a main body 1, an objective 2, a revolver 3, an objective raising and lowering mechanism 4, a stage 5, an epi-illumination unit 6, an observation lens barrel 7, and a confocal scanner 8 (hereinafter, called appropriately as 'scanner 8'). Moreover, an image processing apparatus 20 is connected to the microscope 10, and an image display apparatus 21 is connected to the image processing apparatus 20. In the microscope according to the present embodiment, the immersion microscope objective according to the present embodiment is used for the objective 2.

The stage 5 is provided to the main body 1. A sample 9 is to be placed on the stage 5. Moreover, the episcopic illumination unit 6 is provided at an upper side of the main body 1. Illumination light is irradiated to the sample 9 by the episcopic illumination unit 6. Light from the sample 9 travels through the objective 2, and reaches the observation lens barrel 7. A user is able to observe the sample 9 through the observation lens barrel 7.

Moreover, a laser source (not shown in the diagram) and the scanner 8 are provided at a rear side (right side of a paper surface) of the main body 1. The laser source and the scanner 8 are connected by a fiber (not shown in the diagram). The scanner 8 includes a galvanometer scanner, a pin hole, and a photo detection element, which are disposed at an interior of the scanner 8, and a scanner part is constructed these components. The laser source is a laser which generates an infrared light that can operate two-photon excitation. Light from the laser source, after travelling through the scanner 8 is incident on the objective 2. The objective 2 is positioned at a lower side of the stage 5. Therefore, the sample 9 is illuminated from a lower side as well.

Light (reflected light or fluorescent light) from the sample 9, upon travelling through the objective 2, passes through the scanner 8, and is detected by the photo detection element. In the two-photon excitation, since fluorescent light generates only focal point, a confocal observation is possible. In the confocal observation, it is possible to obtain a cross-sectional image of the sample 9. Therefore, it is not necessary to use a pin hole in the two-photon excitation.

The objective raising and lowering mechanism 4 is connected to the revolver 3. The objective raising and lowering mechanism 4 is capable of moving the objective 2 (the revolver 3) along an optical axial direction. In a case in which, a plurality of cross-sectional images along the optical axial direction of the sample 9 are to be obtained, the objective 2 is to be moved by the objective raising and lowering mechanism 4.

A signal detected by the photo detection element is transmitted to the image processing apparatus 20. An image processing is carried out in the image processing apparatus 20, and an image of the sample 9 is displayed on the image display apparatus 21.

In the example described above, the immersion microscope objective according to the present embodiment has been used for the two-photon excitation observation. However, it is also possible to use the immersion microscope objective according to the present embodiment for a total internal reflection fluorescence observation. In such case, a diameter of a bundle of rays from the laser source is to be kept smaller than an effective aperture of the immersion microscope objective. Moreover, an arrangement is to be made such that, the bundle of rays from the laser source is made to be incident on the immersion microscope objective such that it does not include an optical axis of the immersion microscope objective. Moreover, fluorescence from the sample is to be detected by the photo detection element without allowing passing through the pin hole.

Moreover, in the present embodiment, the immersion microscope objective is used also for an observation of visible light. If in a case in which, the aberration performance in a visible region is not sufficient, an objective for observing visible light and an objective for observing two-photon excitation may be installed on a revolver 3, and may be switched according to the method of observation.

The present invention can have various modified examples without departing from the scope of the invention.

According to the present invention, it is possible to provide an immersion microscope objective for which, the working distance is long, and in which, various aberrations, particularly, the chromatic aberration, in a wide range of the infrared wavelength region, is corrected sufficiently, and a microscope in which the immersion microscope objective is used.

What is claimed is:

1. An immersion microscope objective comprising, in order from an object side:
   a first lens group having a positive refractive power;
   a second lens group having a positive refractive power; and
   a third lens group having a negative refractive power,
   wherein:
   the first lens group includes a cemented lens and at least one positive single lens, and the cemented lens includes a positive lens and a meniscus lens,
   the second lens group changes a divergent light beam to a convergent light beam,
   the third lens group includes an object-side lens group and an image-side lens group,
   in the object-side lens group, a surface nearest to an image side is a concave surface which is directed toward the image side, and in the image-side lens group, a surface nearest to the object side is a concave surface which is directed toward the object side,
   a plurality of lenses having a positive refractive power are provided,
   at least one lens having a positive refractive power from among the plurality of lenses having a positive refractive power has a cemented surface which is cemented to a lens having a negative refractive power, and
   the plurality of lenses having a positive refractive power include a lens which satisfies the following conditional expressions (1) and (2), and the following conditional expression (3) is satisfied:

$$-0.0065 \leq (n_{p1129} - n_{ps})/(n_{ps} - 1) \leq -0.003 \quad (1)$$

$$0.588 \leq 1/n_{ps} \leq 0.667 \quad (2)$$

$$0.1 \leq d_1/WD \leq 1 \quad (3)$$

where,
$n_{p1129}$ denotes a refractive index at a wavelength 1129 nm of the lens having a positive refractive power,
$n_{ps}$ denotes a refractive index for an s-line (wavelength 852.11 nm) of the lens having a positive refractive power,
WD denotes a working distance of the immersion microscope objective, and
$d_1$ denotes a thickness of the lens positioned nearest to the object side.

2. An immersion microscope objective comprising, in order from an object side:
   a first lens group having a positive refractive power;
   a second lens group having a positive refractive power; and
   a third lens group having a negative refractive power,
   wherein:
   the first lens group includes a cemented lens and at least one positive single lens, and the cemented lens includes a positive lens and a meniscus lens,
   the second lens group changes a divergent light beam to a convergent light beam,
   the third lens group includes an object-side lens group and an image-side lens group,
   in the object-side lens group, a surface nearest to an image side is a concave surface which is directed toward the image side, and in the image-side lens group, a surface nearest to the object side is a concave surface which is directed toward the object side,
a plurality of lenses having a positive refractive power are provided,
at least one lens having a positive refractive power from among the plurality of lenses having a positive refractive power has a cemented surface which is cemented to a lens having a negative refractive power, and
the following conditional expression (4) is satisfied:

$$0.8 \leq r_{1c}/r_{1i} \leq 1.6 \tag{4}$$

where,
$r_{1c}$ denotes a radius of curvature of the cemented surface of the cemented lens in the first lens group, and
$r_{1i}$ denotes a radius of curvature of the image-side surface of the cemented lens in the first lens group.

3. An immersion microscope objective comprising, in order from an object side:
a first lens group having a positive refractive power;
a second lens group having a positive refractive power; and
a third lens group having a negative refractive power,
wherein:
the first lens group includes a cemented lens and at least one positive single lens, and the cemented lens includes a positive lens and a meniscus lens,
the second lens group changes a divergent light beam to a convergent light beam,
the third lens group includes an object-side lens group and an image-side lens group,
in the object-side lens group, a surface nearest to an image side is a concave surface which is directed toward the image side, and in the image-side lens group, a surface nearest to the object side is a concave surface which is directed toward the object side,
a plurality of lenses having a positive refractive power are provided,
at least one lens having a positive refractive power from among the plurality of lenses having a positive refractive power has a cemented surface which is cemented to a lens having a negative refractive power, and
the following conditional expression (5) is satisfied:

$$-0.013 \leq (n_{n1129}-n_{ns})/(n_{ns}-1) \leq -0.0097 \tag{5}$$

where,
$n_{n1129}$ denotes a refractive index at a wavelength 1129 nm of the lens having a negative refractive power, and
$n_{ns}$ denotes a refractive index for an s-line (wavelength 852.11 nm) of the lens having a negative refractive power.

4. An immersion microscope objective comprising, in order from an object side:
a first lens group having a positive refractive power;
a second lens group having a positive refractive power; and
a third lens group having a negative refractive power,
wherein:
the first lens group includes a cemented lens and at least one positive single lens, and the cemented lens includes a positive lens and a meniscus lens,
the second lens group changes a divergent light beam to a convergent light beam,
the third lens group includes an object-side lens group and an image-side lens group,
in the object-side lens group, a surface nearest to an image side is a concave surface which is directed toward the image side, and in the image-side lens group, a surface nearest to the object side is a concave surface which is directed toward the object side,
a plurality of lenses having a positive refractive power are provided,
at least one lens having a positive refractive power from among the plurality of lenses having a positive refractive power has a cemented surface which is cemented to a lens having a negative refractive power, and
the following conditional expression (6) is satisfied:

$$0.29 \leq |(WD-d_1)/r_{1c}| \leq 0.48 \tag{6}$$

where,
WD denotes a working distance of the immersion microscope objective,
$d_1$ denotes a thickness of the lens positioned nearest to the object side, and
$r_{1c}$ denotes a radius of curvature of the cemented surface of the cemented lens in the first lens group.

5. An immersion microscope objective comprising, in order from an object side:
a first lens group having a positive refractive power;
a second lens group having a positive refractive power; and
a third lens group having a negative refractive power,
wherein:
the first lens group includes a cemented lens and at least one positive single lens, and the cemented lens includes a positive lens and a meniscus lens,
the second lens group changes a divergent light beam to a convergent light beam,
the third lens group includes an object-side lens group and an image-side lens group,
in the object-side lens group, a surface nearest to an image side is a concave surface which is directed toward the image side, and in the image-side lens group, a surface nearest to the object side is a concave surface which is directed toward the object side,
a plurality of lenses having a positive refractive power are provided,
at least one lens having a positive refractive power from among the plurality of lenses having a positive refractive power has a cemented surface which is cemented to a lens having a negative refractive power,
the second lens group includes a movable lens group which moves along an optical axis, and
the following conditional expressions (7) and (8) are satisfied:

$$-1.1 \leq m_{g2} \leq -0.8 \tag{7}$$

$$-0.3 \leq f/f_{2m} \leq 0 \tag{8}$$

where,
$m_{g2}$ denotes a magnification of the second lens group,
f denotes a focal length of the immersion microscope objective, and
$f_{2m}$ denotes a focal length of the movable lens group.

6. A microscope comprising:
a scanner section;
a main-body section; and
the immersion microscope objective according to claim 1.

* * * * *